(12) United States Patent
Fruehling et al.

(10) Patent No.: US 10,900,837 B2
(45) Date of Patent: Jan. 26, 2021

(54) INTEGRATED COMPACT MMW SPECTROSCOPY CELL SYSTEM AND METHOD

(71) Applicant: Texas Instruments Incorporated, Dallas, TX (US)

(72) Inventors: Adam Joseph Fruehling, Garland, TX (US); Juan Alejandro Herbsommer, Allen, TX (US); Argyrios Dellis, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 125 days.

(21) Appl. No.: 16/234,195

(22) Filed: Dec. 27, 2018

(65) Prior Publication Data
US 2020/0209062 A1 Jul. 2, 2020

(51) Int. Cl.
*G01J 3/42* (2006.01)
*G01N 21/3581* (2014.01)

(52) U.S. Cl.
CPC ............ *G01J 3/42* (2013.01); *G01N 21/3581* (2013.01)

(58) Field of Classification Search
CPC .. A61B 5/097; A61B 5/082; G01J 3/42; G01J 3/433; G01J 2003/421; C12Q 1/6837; G01N 33/497; G01N 15/10; G01N 21/65; G01N 27/00
See application file for complete search history.

(56) References Cited

U.S. PATENT DOCUMENTS

2010/0002234 A1* 1/2010 Cormier ................ G01N 21/39
356/436

* cited by examiner

*Primary Examiner* — Don K Wong
(74) *Attorney, Agent, or Firm* — Michael A. Davis, Jr.; Charles A. Brill; Frank D. Cimino

(57) ABSTRACT

A compact mmW spectroscopy cell system for detecting volatile organic compounds (compounds) in a gas. The system includes a gas collection chamber, an input buffer cavity for receiving the gas from the gas collection chamber, pumping devices to pass the gas from the buffer cavity to an absorption cell and maintain pressure, and a transceiver connected to the cell. The transceiver interrogates the absorption cell filled with the gas by passing a high frequency electromagnetic signal and sweeping the signal to generate an absorption spectra which is compared to a spectroscopy database for detecting the compounds in the gas. The absorption cell, collection chambers, and pumping devices are fabricated with standard CMOS processing techniques at chip and wafer scale. The transceiver bonded to the absorption cell with chip scale integration.

29 Claims, 25 Drawing Sheets

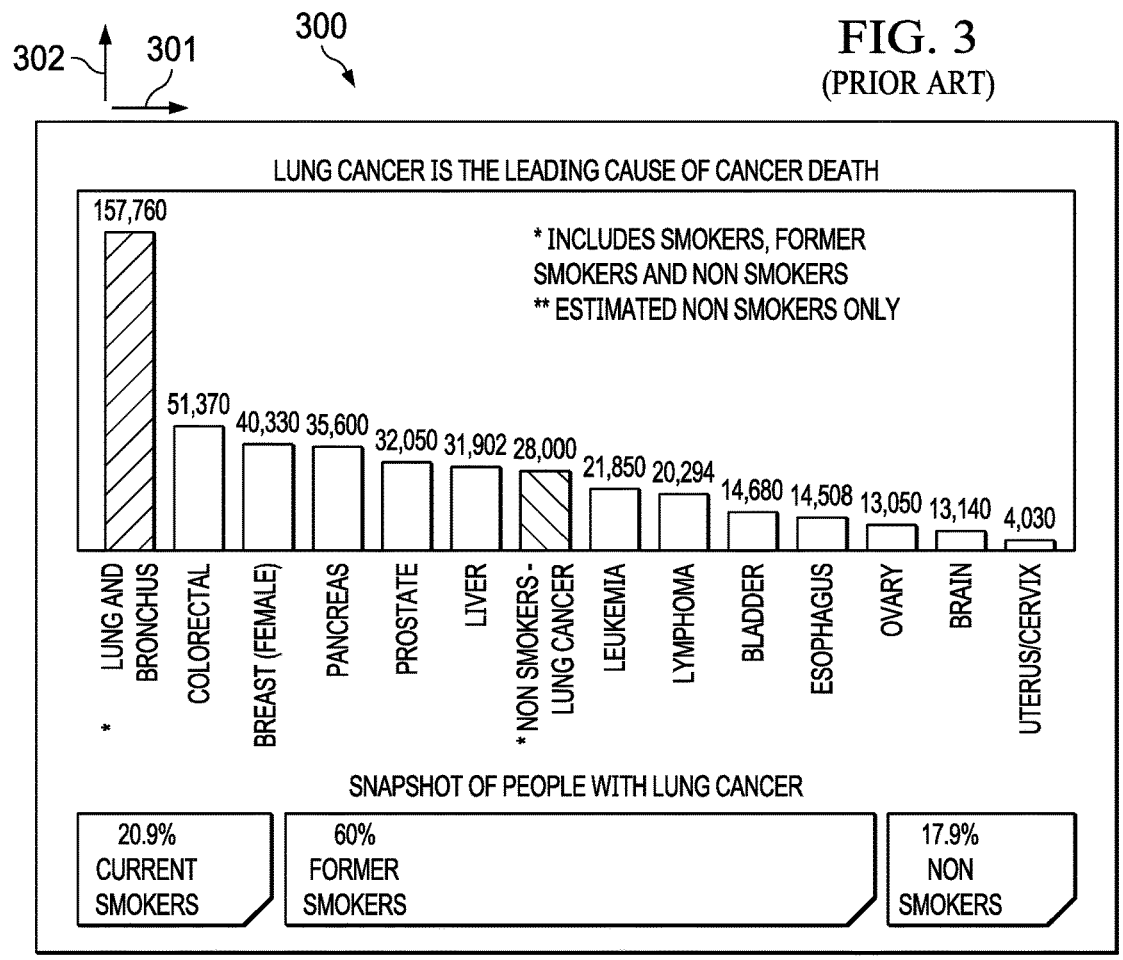
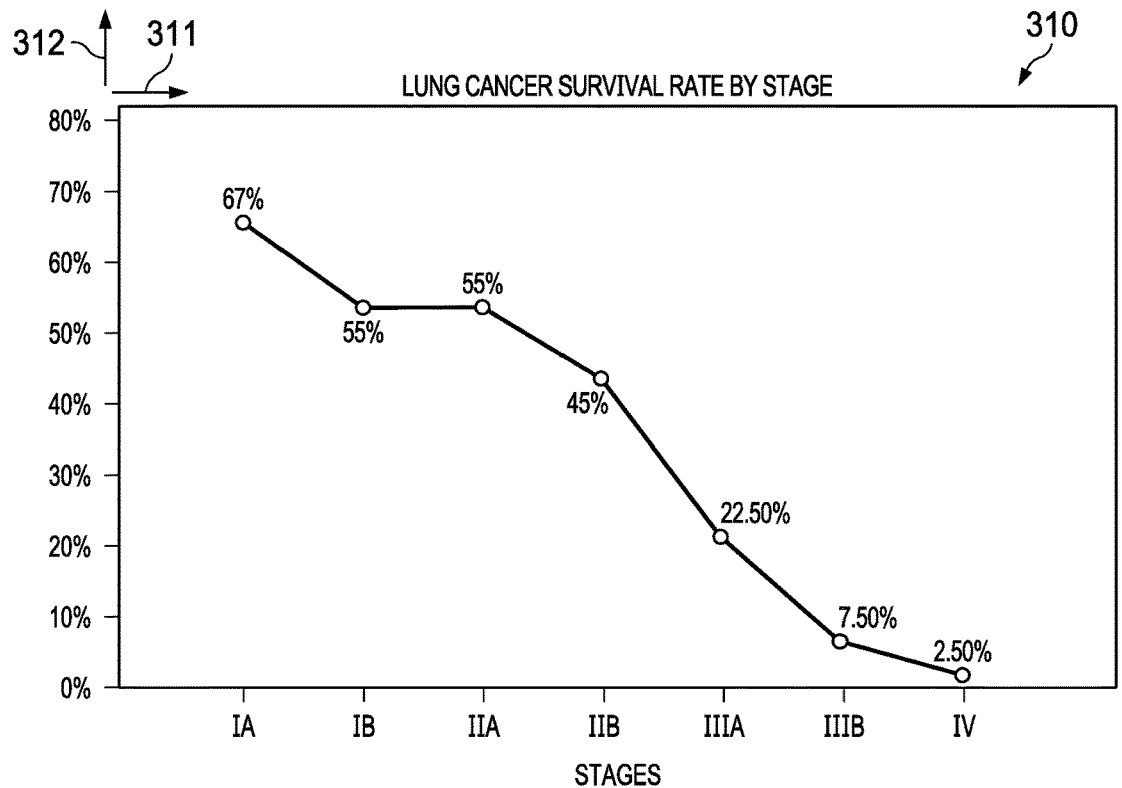
FIG. 3
(PRIOR ART)

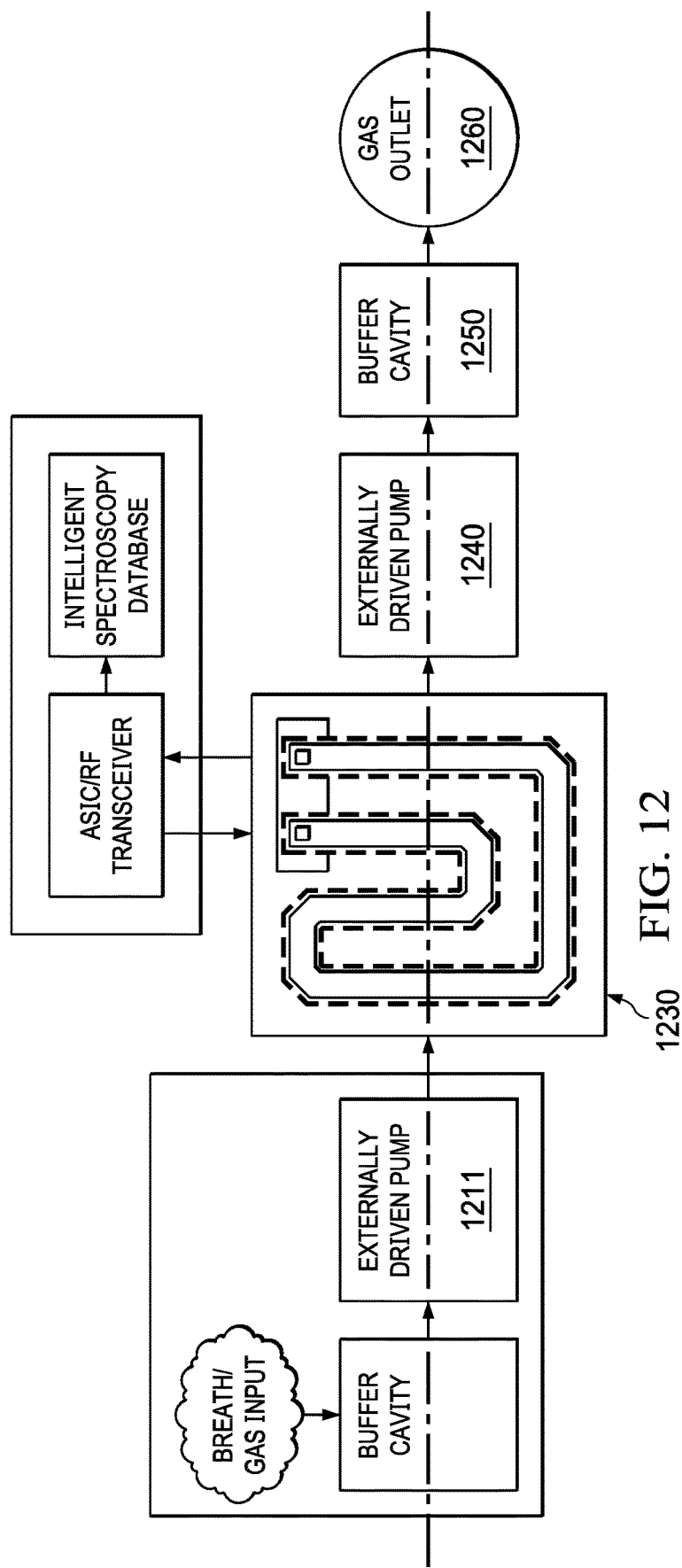

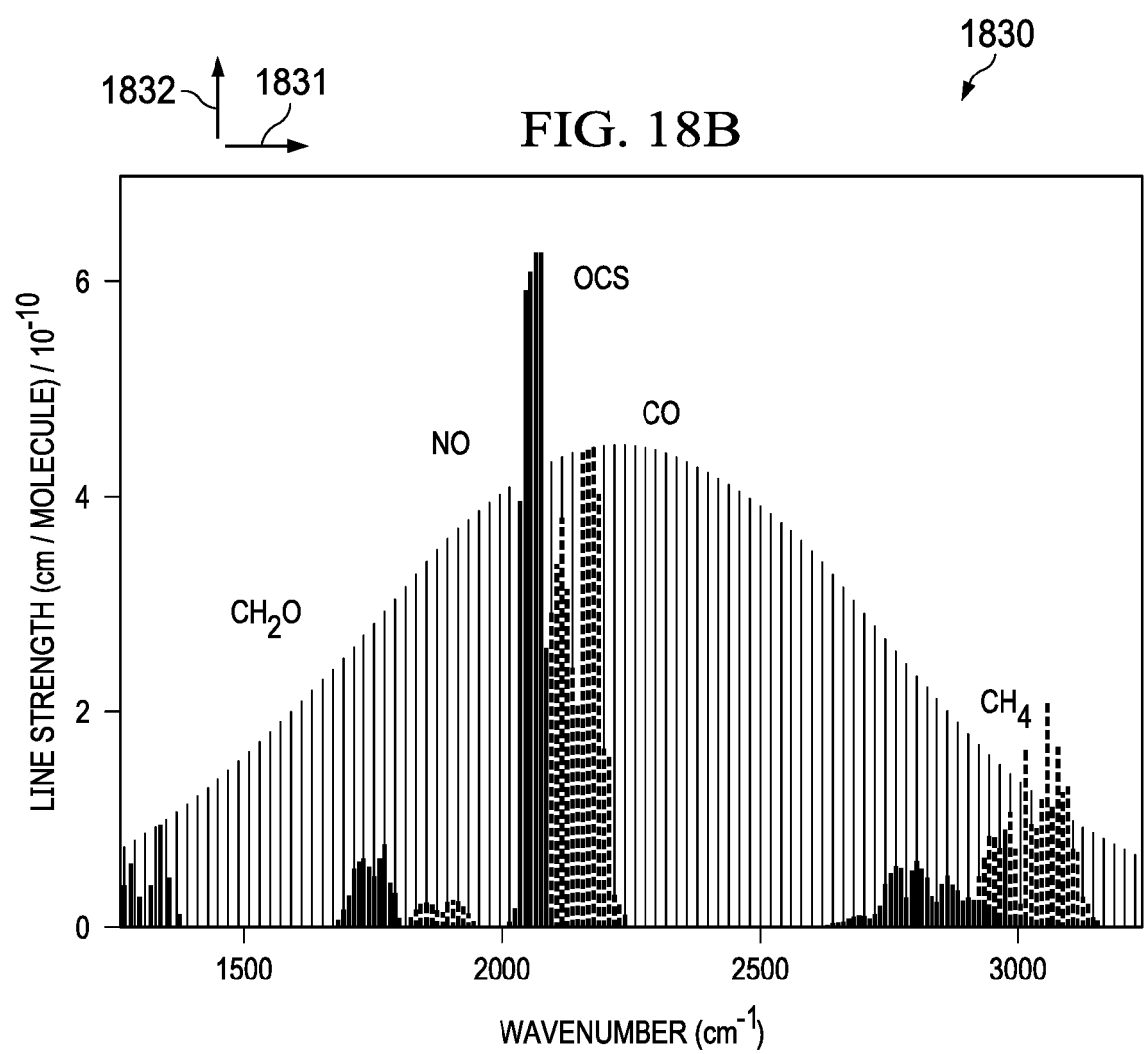

INTEGRATED COMPACT MMW SPECTROSCOPY CELL SYSTEM AND METHOD

BACKGROUND

Technical Field

This relates generally to a compact integrated mmW spectroscopy cell for detection of volatile organic compounds, and more particularly to a chip-scale integrated pump and millimeter wave (mmW) spectroscopy physics cell formed in a single process flow on silicon.

Description of Related Art mmW spectroscopy offers significant promise for volatile organic compounds detection for applications ranging from disease detection, explosive identification, hazardous chemical detection, generalized chemical and gas sensors, and breathalyzer applications. However, existing spectroscopy solutions focus on higher frequencies in the sub-THz and THz bands requiring heterogeneous integration of transceivers in significantly more expensive substrate technologies such as SiGe, GaAs, InP, SiGe, or GaN. Additionally, all known mmW spectroscopy systems developed to date are physically large (on the order of 0.5-2 cubic meters). FIG. 1 (100) illustrates an absorption spectra for gases with intensity (102) on y-axis and frequency on x-axis (101). The absorption peaks for some gases are shown in the detailed chart (110). For example, Pyridine has an absorption peak at 251.75 GHz (103); Acrolein has an absorption peak at 251.89 GHz (105), and Thiophene has an absorption peak at 251.77 GHz (104). Current gas sensors usually detect a single gas each time.

FIG. 2 (200) illustrates a conventional spectroscopy system that includes a series of three meter long tubes (201) with a set of reflectors (203) pumped with a large physical vacuum with supporting electronics (202). The volume of the system may be on the order of 0.5-2 cubic meters. Furthermore, all known mmW spectroscopy systems rely on utilization of external pumps, valves, and large vacuum sealed chambers further limiting device scaling and integration. Current spectroscopy measurements generally operate in a free space propagation mode.

Specific to the disease detection application, current medical techniques require expensive and/or invasive procedures or otherwise suffer from high error rates and non-negligible negative patient impact. For some spectroscopy applications, the transmission spectra are contained in a closed chemical ecosystem that drives cost and increases market segmentation due to the need for a unique sensor design for each element. Applications dependent on single-walled carbon nanotubes and functionalized surfaces still face challenges for manufacturing repeatability, environmental contamination, disposability, and a requirement for numerous unique sensors to detect individual molecules.

Early detection of a disease can be key to survival. Cancer is the second leading cause of death. For example, as illustrated in FIG. 3 (300), the number of deaths (302) is plotted against the cancer type (301). It is clear from the plot that Lung cancer is the leading cause of death by cancer, and the majority of those deaths in part due to late stage screening. The survival rate (312) for lung cancer versus stage (311) is further illustrated in FIG. 3 (310). Current screening methods are limited and include surgical techniques (e.g. biopsy) and radioactive techniques, which produce high false positive rates and non-negligible risks to patients in addition to being expensive and not uniformly insured. Other screening methods include utilization of chemical sensors where functionalized surfaces have required numerous sensors to uniquely identify necessary compounds.

Exhaled breath provides a low cost, minimally invasive mechanism for non-invasive detection of unique biomarkers associated with specific diseases as illustrated in FIG. 4 (400). Research has also indicated that numerous diseases can be uniquely identified in the presence of other diseases providing high accuracy, low false positives, and good discrimination. It has been well demonstrated that early detection of diseases, such as lung cancer, is a crucial metric for survivability. Furthermore, as illustrated in FIG. 4A (400), FIG. 4B (410) and FIG. 4C (420), several studies are reporting on analysis of exhaled volatile organic compounds (compounds) for high accuracy disease detection and discrimination in the complex and confounding presence of other diseases. For chemical sensors, handheld breathalyzer and explosive identification applications, device integration, cost, scaling, and power consumption are all significant concerns not yet fully addressed by products on the market.

Most conventional spectroscopy uses atomic molecular transitions which are probed in the optical domain. Lasers and fiber optic waveguides offer significant challenges in fabrication and wafer scale integration of components. An extra type of heterogeneous integration may be required between the transceiver chip, laser/fiber coupling, and the spectroscopy cell. However, the tolerance for error during fabrication is low for an optical wave system. The functionality of the system often requires e-beam lithographic steps to achieve dimensional precision on the order of tens of nanometers to realize spectroscopic combs and couplings. Thus, there is need for a spectroscopic system that can be achieved with standard lithographic techniques in mass manufacturable wafer scale processes.

Some hazardous chemicals, such as formaldehyde, have required dedicated transducers, colorimetry from chemical reactions, or high temperatures which can pose an ignition risk in certain environments. Such sensors continue to suffer from some combination of low accuracy, low sensitivity, large size, or high cost.

Existing mmW spectroscopy cells use physically large, non-integrated absorption cells (on the order of meters) that are often made of glass and steel. Current spectroscopy cells additionally depend on InAs, ZnTe, GaSe, GaAs, GaN, SiGe sources or nonlinear crystals, or lasers for signal source generation. In addition, current spectroscopy cells require external pumps, valves, concentrators, which are not fully integrated into a system. Some current integrated systems also require hermetic absorption chambers.

SUMMARY

Example embodiments include a compact mmW spectroscopy cell for detecting compounds in a gas. The compact cell includes a gas collection chamber, an input buffer cavity for receiving the gas from the gas collection chamber, pumping devices to pass the gas from the buffer cavity to an absorption cell and maintain pressure and a transceiver connected to the cell. The transceiver interrogates the absorption cell filled with the gas by passing a high frequency electromagnetic signal and sweeping the signal to generate an absorption spectra which is compared to a spectroscopy database for detecting the compounds in the gas. The absorption cell, collection chambers, pumping devices are fabricated with standard CMOS processing techniques at chip and wafer scale. The transceiver is bonded to the absorption cell with chip scale integration.

BRIEF DESCRIPTION OF THE DRAWINGS

FIG. 3 illustrates a conventional chart for cancer rate and survival rate for cancer at various stages.

FIG. 12 depicts an example system of the compact mmW spectroscopy cell of FIG. 6 with an externally driven pump, according to one aspect of this description.

FIGS. 18A-B illustrates wafer level and system level components for removal of contaminants in collected samples, according to one aspect of a preferred embodiment.

DETAILED DESCRIPTION

This description relates to the particular problems of detecting volatile organic compounds in a gas with milli- meter wave (mmW) compact spectroscopy cell. Some of the embodiments include fabrication on low cost silicon substrates that enable integration of a pump and physics cell (absorption cell) into a single process flow. Other embodiments may include process development that allows for ASIC transceiver integration on a chip with the spectroscopy cell. Other embodiments include a device that can work with monolithically integrated Knudsen, electro-osmotic, or ionic pumps to achieve low pressures required for generating absorption spectra. Yet, other example embodiments include a device that can work with existing external pumps and gas flow architectures. In other embodiments, the spectroscopy device does not require extensive fabrication or assembly effort to achieve hermetic bonds or seals to achieve the low pressures required for observing molecular spectra.

In this description, the terms "physics cell," "absorption cell" and "absorption cavity" are used interchangeably to reference a structure that enables an electromagnetic signal to travel through a metallic waveguide fabricated on a chip-scale wafer level. The structure is capable of being filled with a gas. The electromagnetic signal is used to interrogate the gas captured in the chip-scale waveguides. The term mmW as used herein is a Millimeter wave (also millimeter band) in the band of spectrum between 30 gigahertz (Ghz) and 300 Ghz. In some instances the band may be a G-band that explicitly extends to 325 GHz and Y-band that extends to 1.1 THz.

FIGS. 5A-5I illustrates a method for fabricating an integrated pump and mmW spectroscopy cell with a CMOS process, according to an embodiment. The operations may be performed in the order shown, or in a different order. Further, the operations may be performed sequentially, or two or more of the operations may be performed concurrently. In general the absorption cell is fabricated on a first wafer (501) with a CMOS process. The buffer cavity, the first pumping device, the second pumping device, the input buffer cavity, and the output buffer cavity are fabricated on a second wafer (510) also with a CMOS process. The first wafer and the second wafer are bonded (513) to create the compact integrated mmW spectroscopy cell. The absorption cell may be fabricated with a series of breaks in bond lines on a wafer as further illustrated in FIG. 6 and FIG. 7. The CMOS process with silicon substrate provides a greater tolerance in lithography for the fabrication of the waveguide without degrading functionality.

Figure 1:
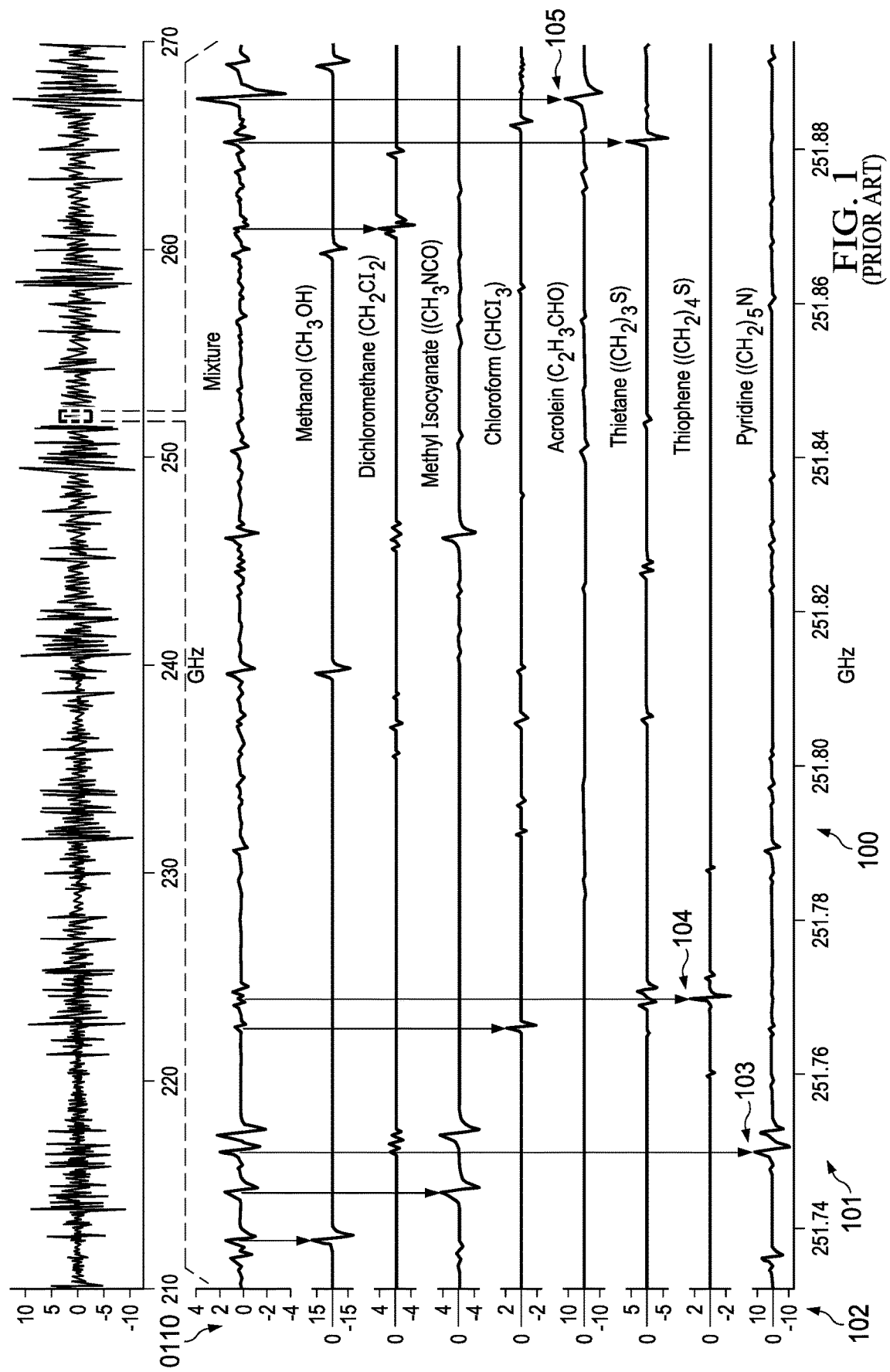
FIG. 1 illustrates a prior absorption spectrum for 14 gases.
Figure 2:
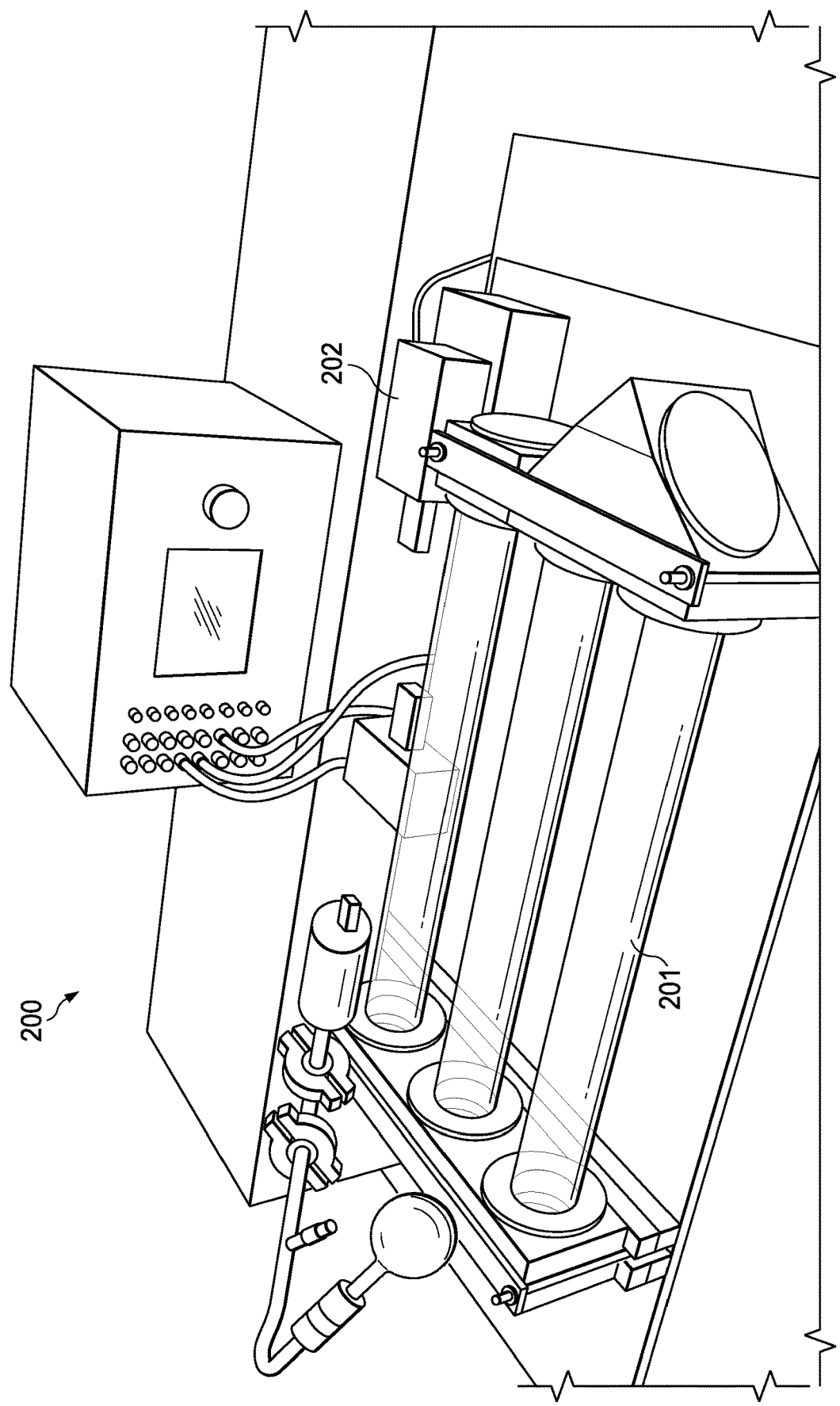
FIG. 2 illustrates a conventional system for an mmW gas sensor.
Figure 4A:
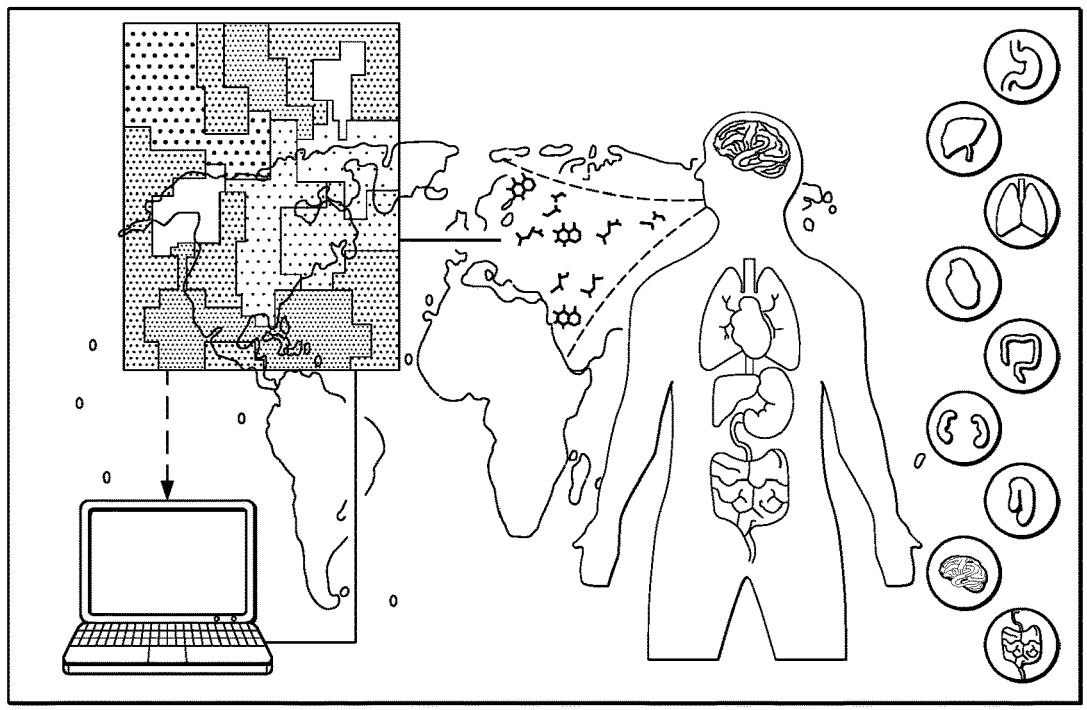
FIGS. 4A-4C is a conventional diagnosis for 17 diseases using pattern analysis of exhaled molecules.
Figure 4B:
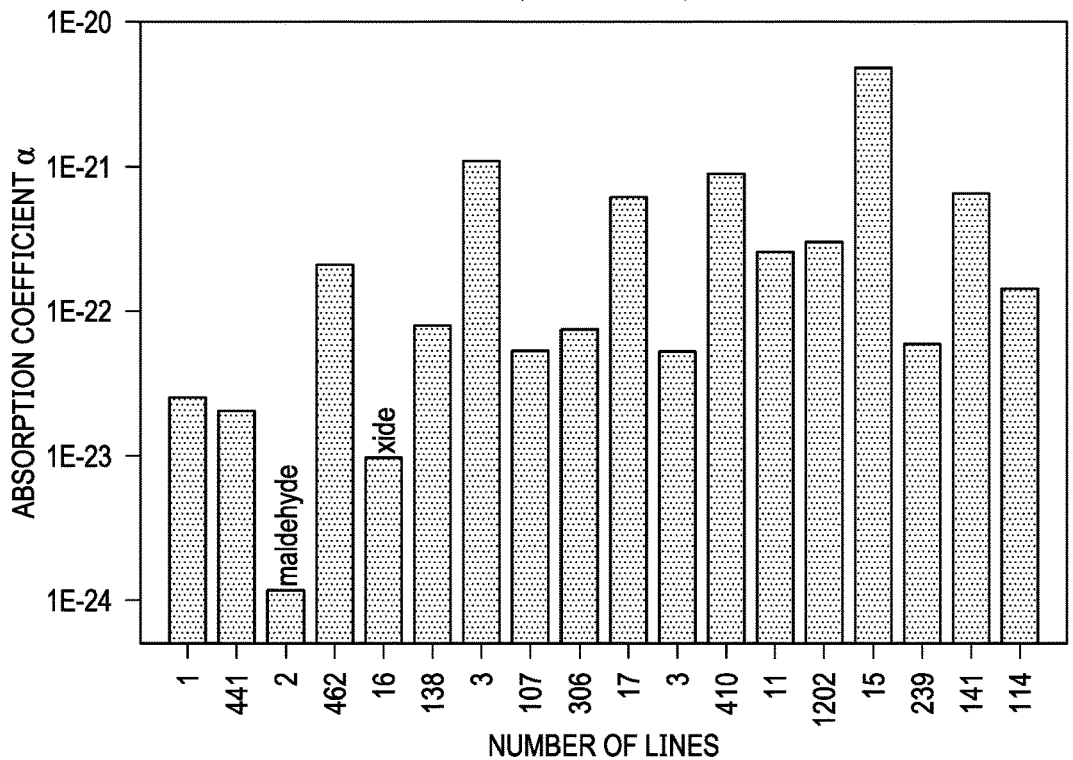
Figure 4C:
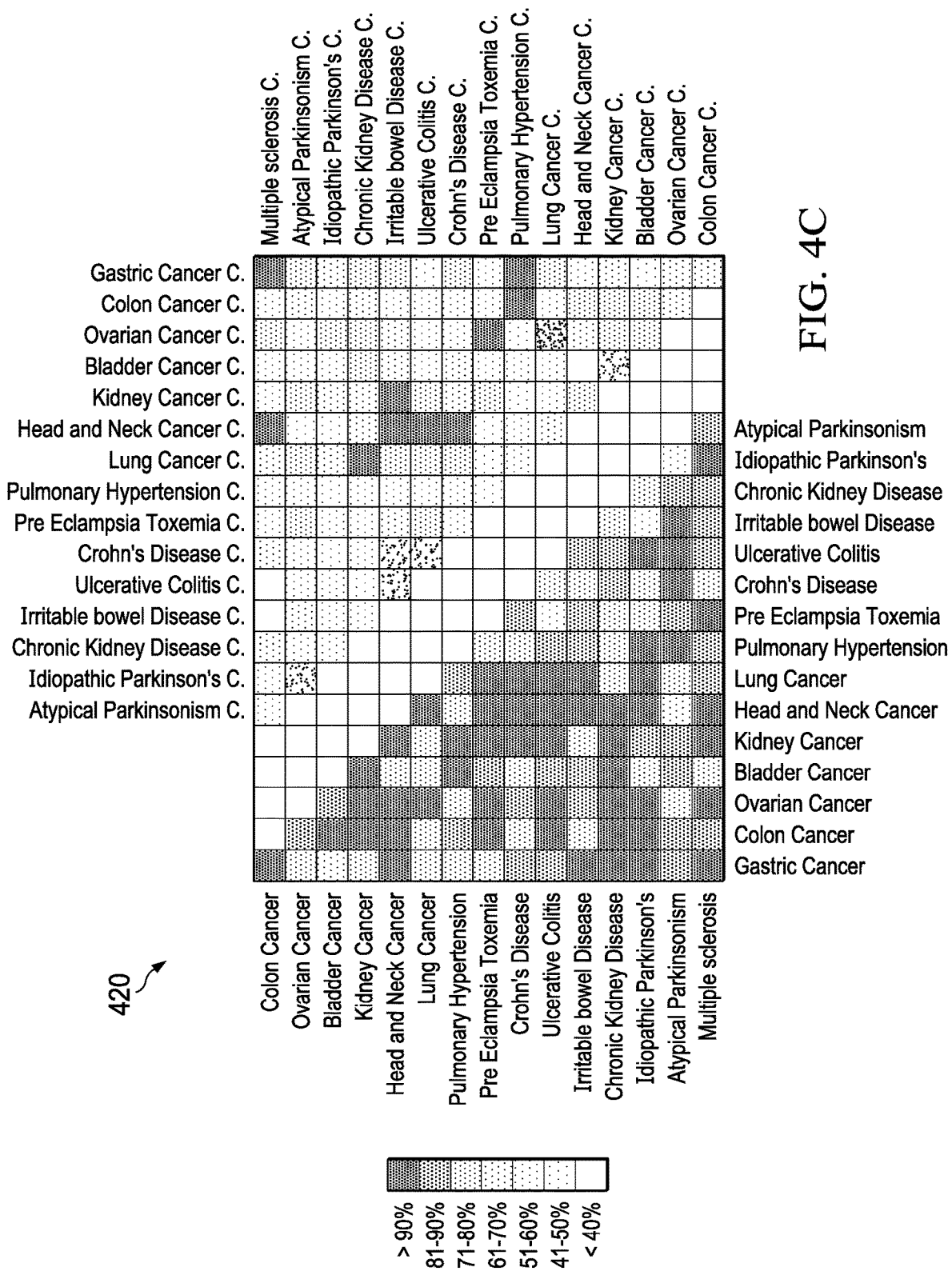
Figure 5A:
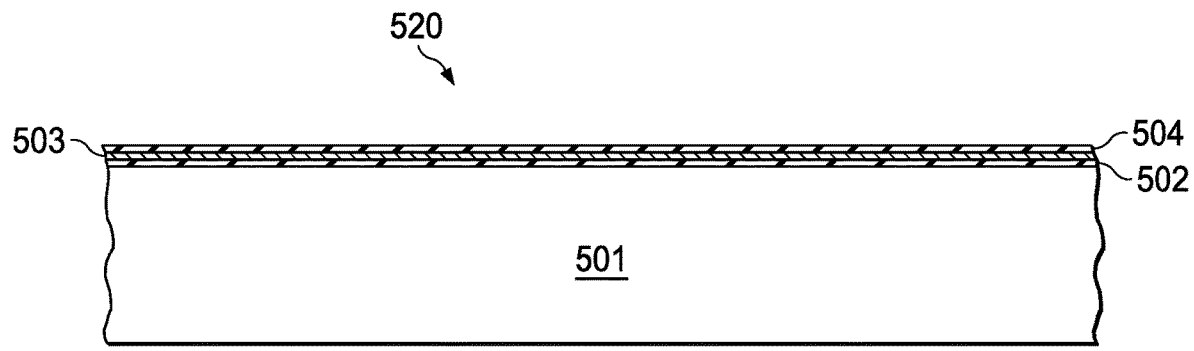
FIGS. 5A-5I illustrates an example flow chart for fabricating an integrated pump and absorption cell, according to one aspect of this description.
Figure 5B:
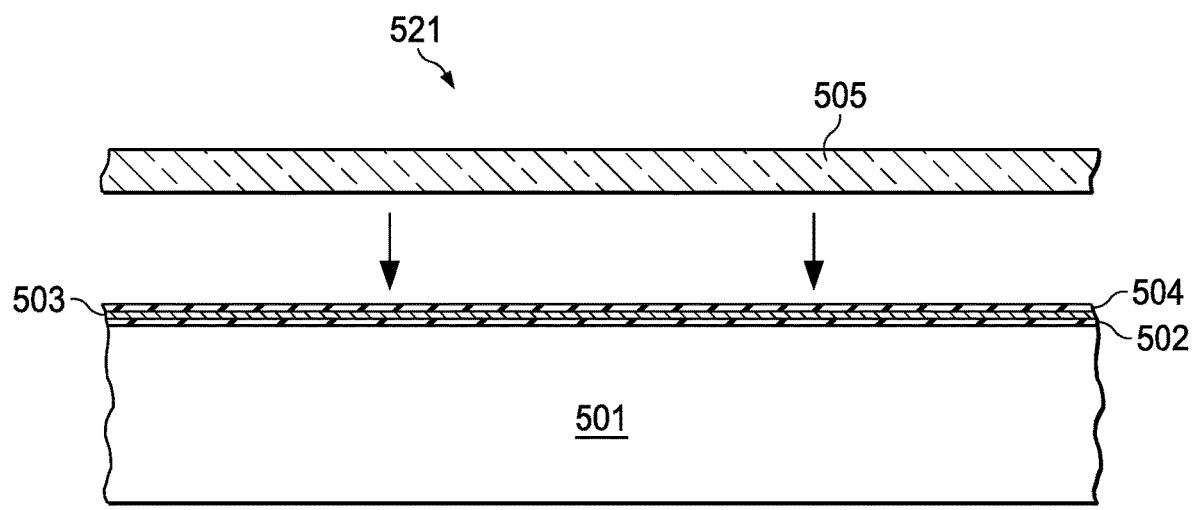
Figure 5C:
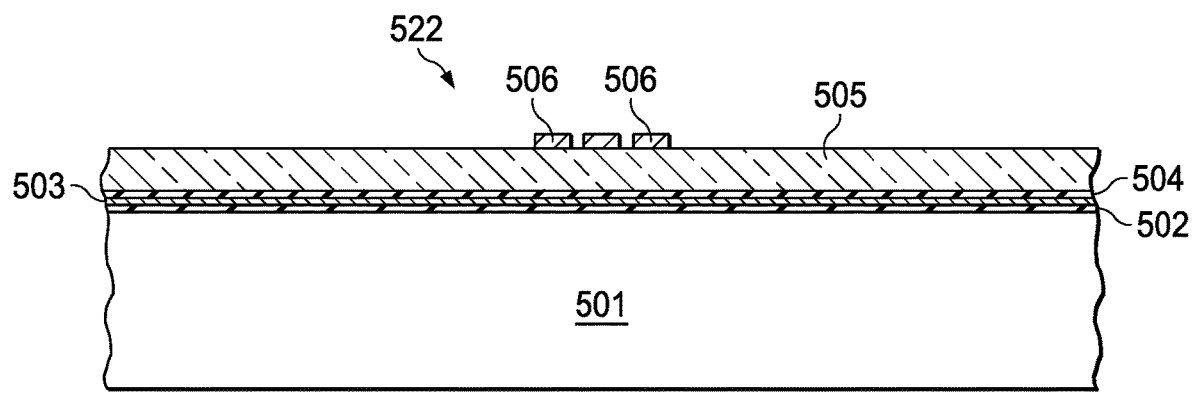
Figure 5D:
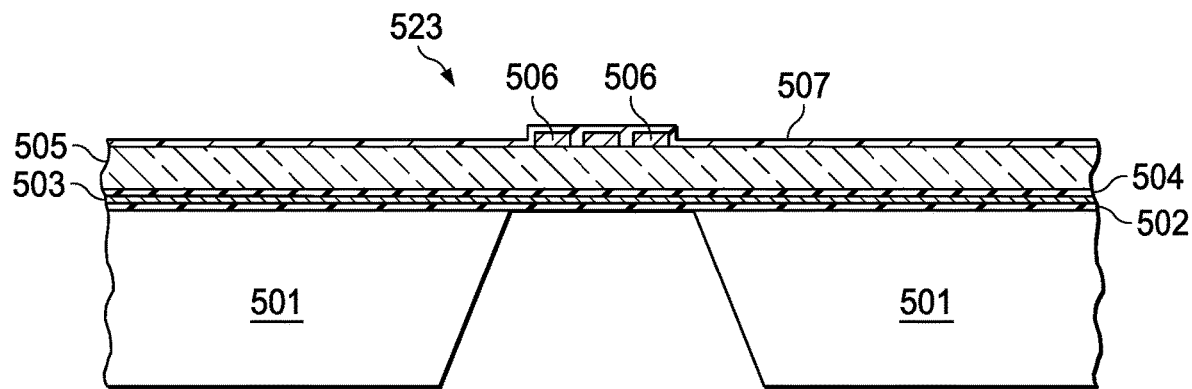
Figure 5E:
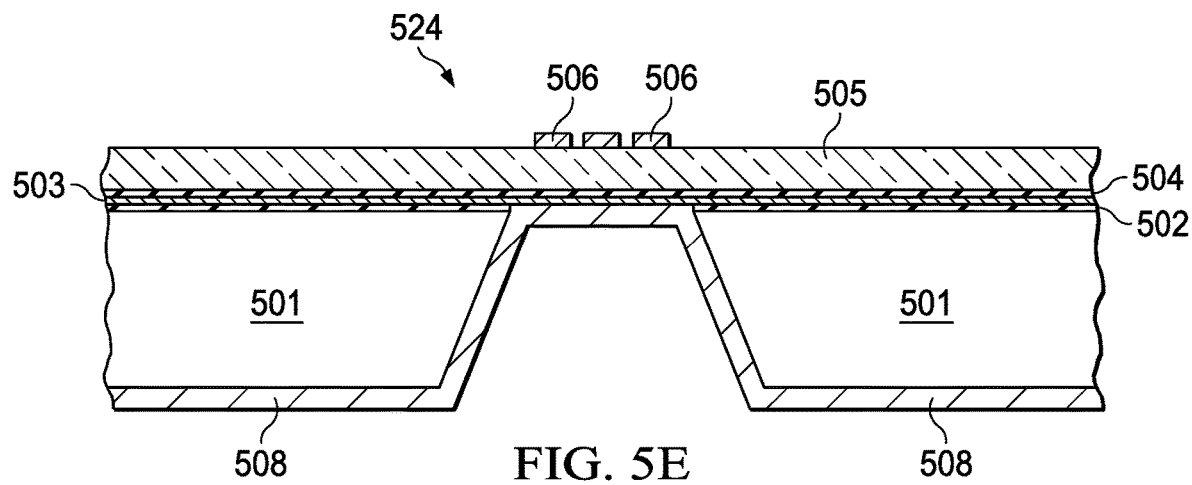
Figure 5F:
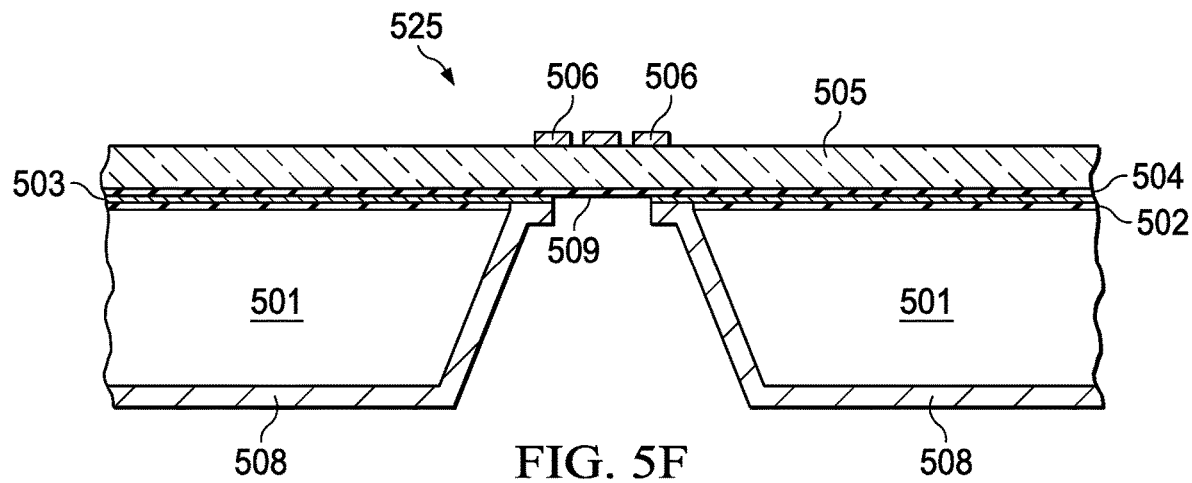
Figure 5G:
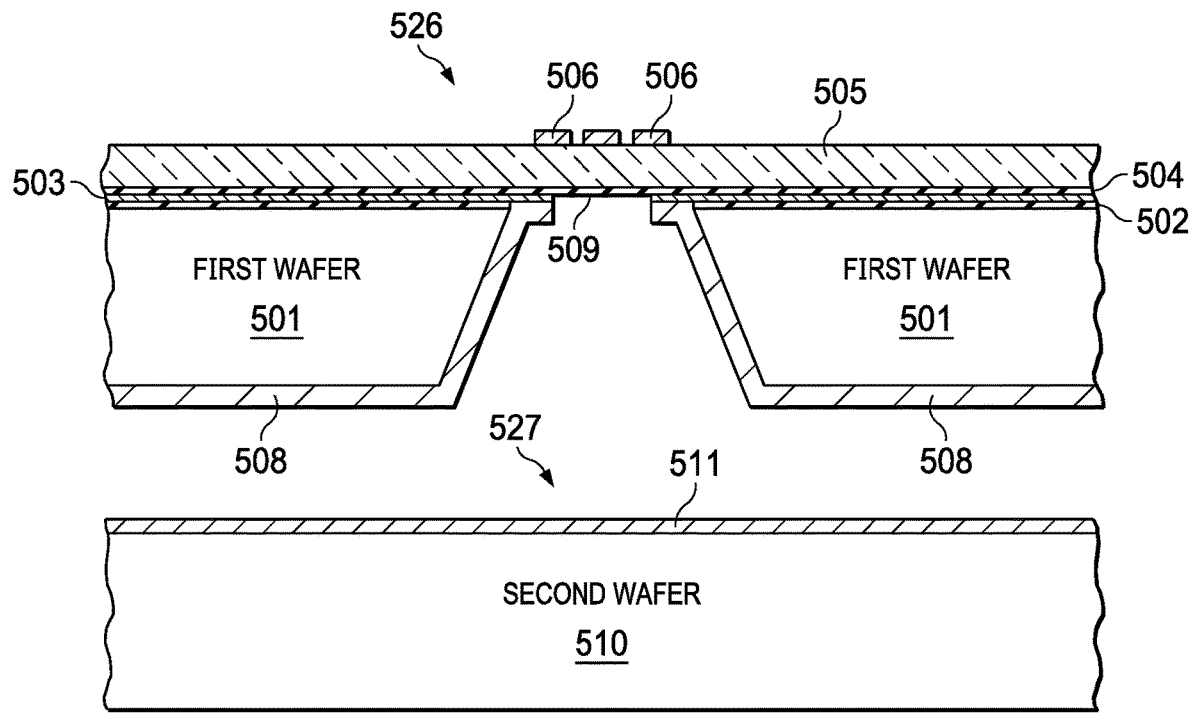
Figure 5H:
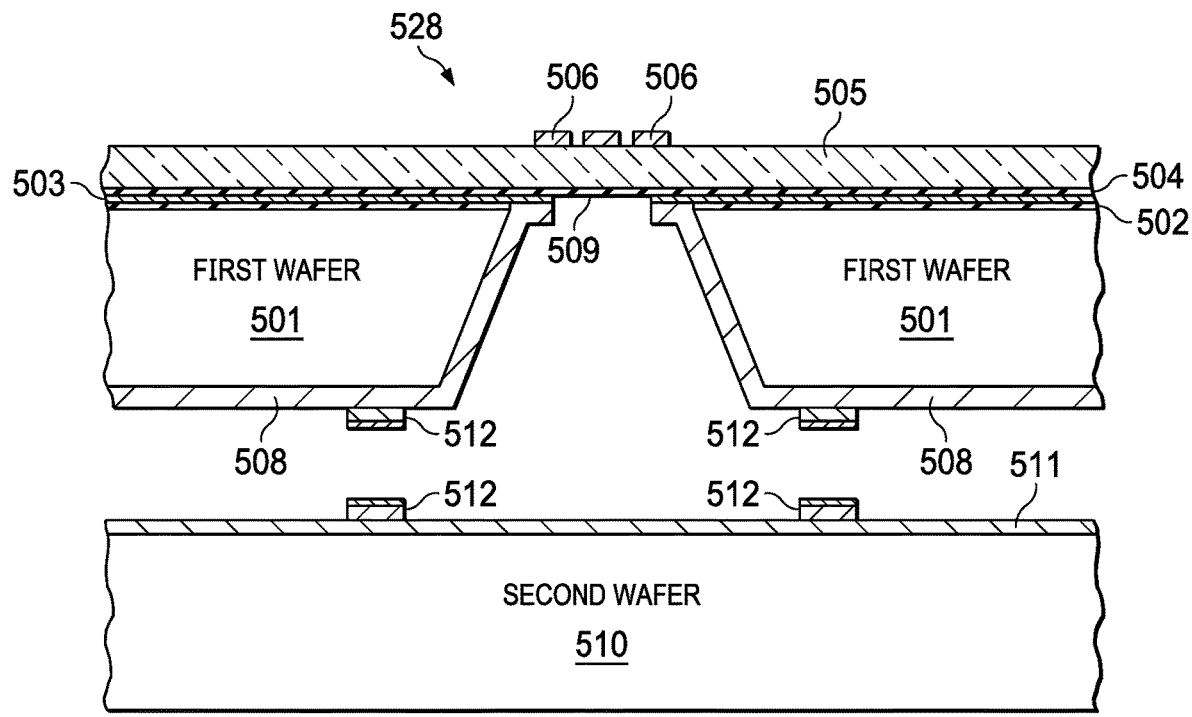
Figure 5I:
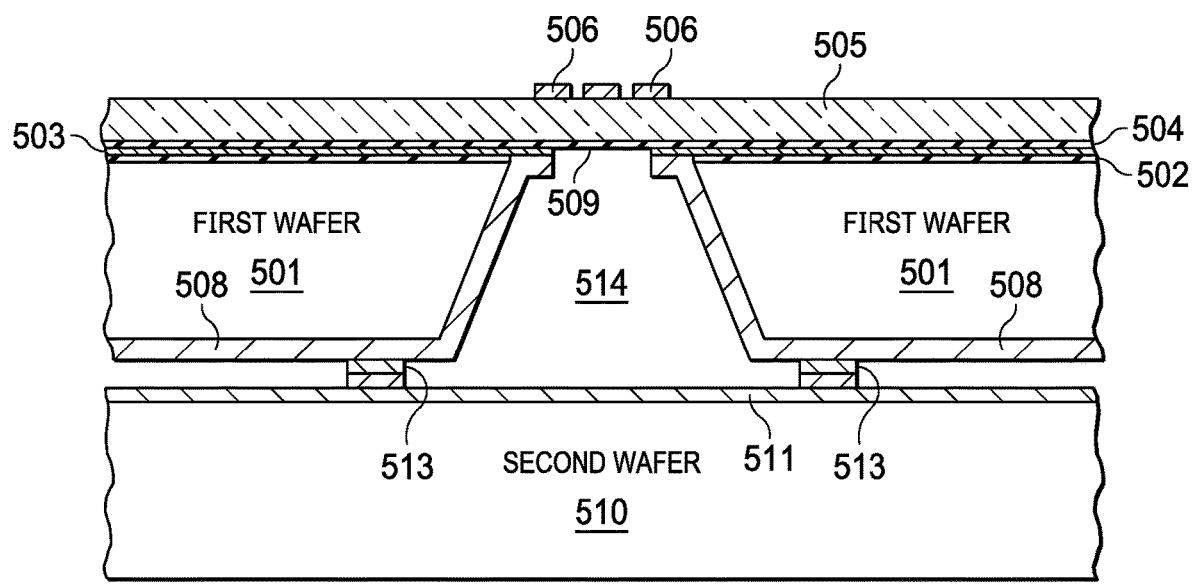

FIG. 5A illustrates an initial step in the method which includes growing a Silicon oxide layer (502), depositing a metal layer (e.g., metal layer 503) about 1 um thick, followed by depositing another Silicon oxide layer (504). In FIG. 5B (521), the method includes bonding a non-conductive structure (e.g., glass) (505) to the oxide layer (504). The thickness of the glass may range from 100 um to 500 um depending on the frequency band of operation of the device. The thickness of the glass is determined as optimizing the insertion loss of the signal from the antenna to the metallic waveguide cavity. In FIG. 5C (522), the method includes patterning the metal layer (506). The patterning may include depositing and etching the metal layer (506). In FIG. 5D (523), the method includes depositing a dielectric layer (e.g., dielectric layer 507) on a surface of the metal layer (506) to protect the metal and then performing a wet etch of the first wafer to create an opening (150) in the substrate of wafer 1 (501). The width and depth of the cavity depends on the frequency band of operation of the device. Metallic waveguides are designed to transmit only one mode. In order to achieve this objective the dimensions of the waveguide are chosen such that the low end of the band does not go below the cutoff frequency of the waveguide and on the high side of the desired band is not high enough that allows other modes interfere with the chosen mode of signal propagation. In FIG. 5E (524), the method includes clearing of the oxide (507) with a dry etch followed by sputter depositing 40 nm of Ti (adhesion layer) and 1 um of Au (it can be other high conductivity metal like Cu) (508) into the opening (540) created in step 523. In FIG. 5F (525), the method includes spray depositing a resist, followed by mask less patterning of the Cu (508) in the opening (540) such that the Cu (508) is patterned (509). A cavity (e.g., cavity 509) is then created in the first substrate in the first wafer (501). In FIG. 5G (526, 527), a second wafer (510) may be sputter deposited with 40 nm of Ti (adhesion layer) and 1 um of a low resistivity metal (like AU or Cu) (511). In FIG. 5H (528, 529), the first wafer (501) and the second wafer (510) may be deposited, patterned, and with plate bond layer comprising In/Au/Ni (512). Finally in FIG. 5I (530), the method includes a wafer scale integration with bonding (513) of the wafer 1 and wafer 2 at the bond layer (512) to create a cavity (514).

Figure 6:
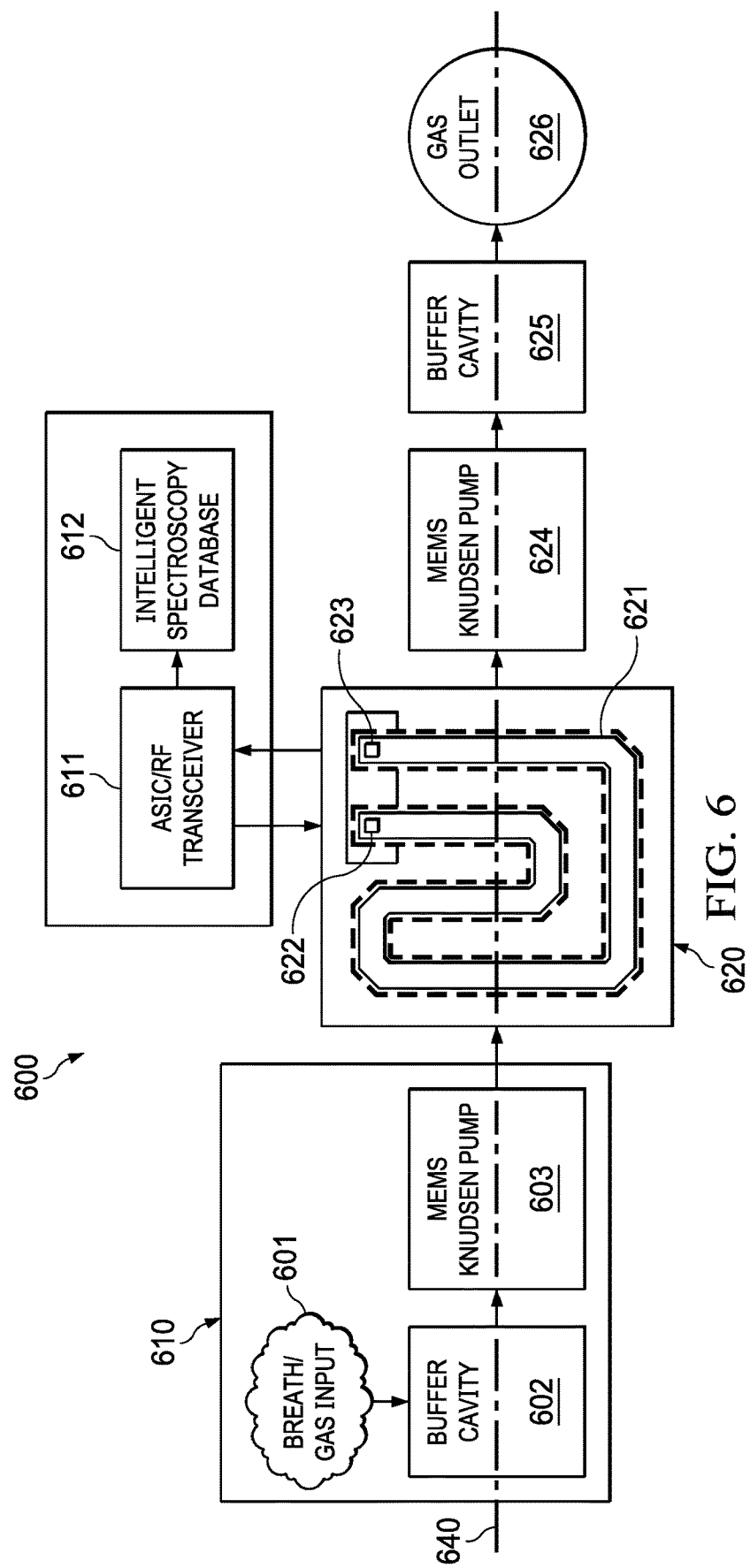
FIG. 6 illustrates an example system diagram of a compact mmW spectroscopy cell, according to one aspect of this description.
Figure 7:
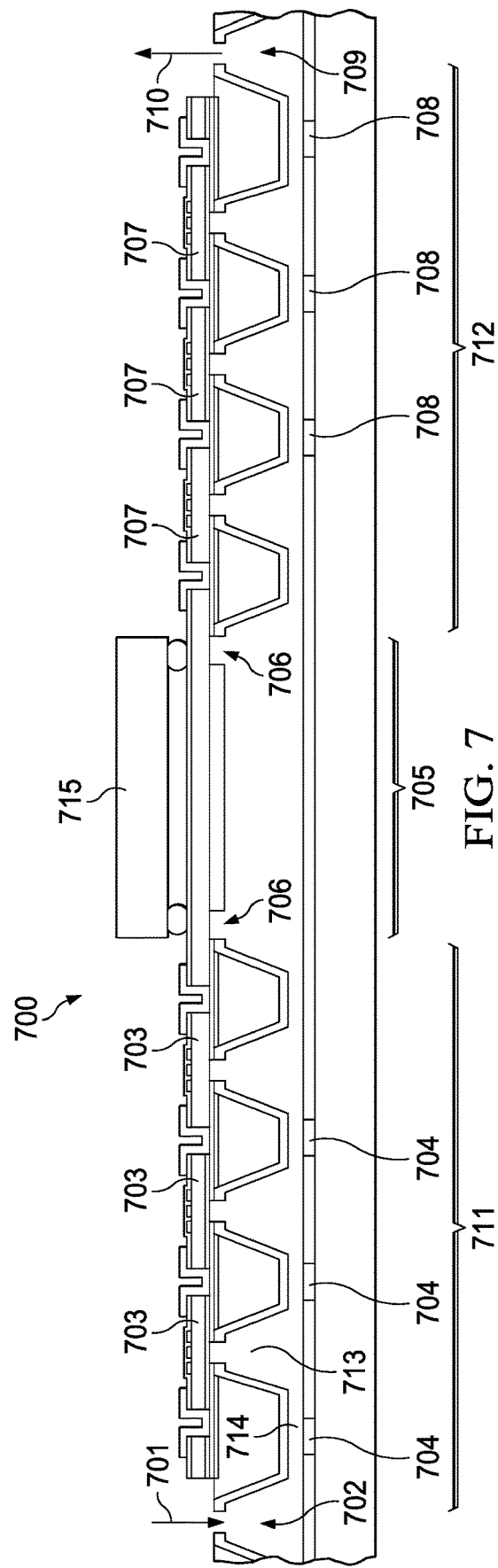
FIG. 7 depicts an example cross section of the compact mmW spectroscopy cell of FIG. 6, according to one aspect of this description.

Utilizing substantially similar processing steps as outlined above for wafer 1 (501), and the addition of a thicker oxide deposition, resistive metal deposition, and metal routing lithography step on wafer 2 (510) an integrated pump and mmW spectroscopy cell is created as shown in FIGS. 6 and 7.

FIG. 6 illustrates a compact integrated mmW spectroscopy cell system (600) for detecting compounds, elements or VOC in a gas. The system includes a gas collection chamber (601) for collecting the gas, and an input buffer cavity (602) for receiving the gas from the gas collection chamber (601). The system further includes a first pumping device (603) that pumps the gas from the buffer cavity (602) to an absorption cell (621). The device further includes a transceiver electrically coupled to the first and second antennas, and is configured to launch a transmit signal into the cavity through the first antenna (622), the signal interrogates the molecules in the cavity generating an absorption dips at the quantum transition frequencies of the gases in the cavity and the signal is detected in the second antenna (623). By scanning a frequency band of interest it is possible to detect the presence of different gases in the cavity by identifying the quantum absorption frequencies. Optionally, two valves (not shown) may be inserted between the waveguide and the pumps with one pump on each side. In this way we can isolate the cell from the atmospheric environment. The valves as an optional embodiment that may reside at any interface on both sides of the cell, but preferentially before the input and output pumps. The absorption cell (620) is electrically connected to a transceiver (611) through receive and transmit antennas. These antennas can be excited via additional antennas on a second substrate or through direct connection to the transceiver. In some instances, wireless interrogation at is distance is possible. A waveguide (621) may further be designed to be sensitive to the bandwidth and frequency range of the transceiver. According to an example embodiment, the waveguide has dimensions compatible with a WR5 band (140-220 GHz). It should be noted that the operating range of a waveguide can be roughly scaled within a finite limitation on total bandwidth of the geometry. According to another example embodiment, depending on the band of interest the waveguide is selected from a group consisting of WR5, WR6, and WR12. In other embodiments, the waveguide has dimensions compatible with a frequency band that within a range from 0.32 GHz to 1100 GHz. A second pumping device (624) may be used to control the pressure inside of the absorption cell (620), and the second pumping device connected to the absorption cell (620). An output buffer cavity (625) connected to the second pumping chamber (621) may receive the gas, decompress and purge the gas outside through a gas outlet (626). The transceiver (611) interrogates the absorption cell filled with the gas by passing a high frequency electromagnetic signal and sweeping the signal to generate an absorption spectra; the spectra may be compared to a spectroscopy database (612) for detecting the compounds in the gas based on the result of the comparison. According to an example embodiment, the compound is a (VOC) organic compound in an exhaled breath sample. According to another example embodiment, the compound is a disease marker in an exhaled breath sample. According to yet another example embodiment, the compound is a toxin. The example spectroscopy cell system of FIG. 6 can advantageously detect multiple markers without the need for developing unique sensors for each marker type. A cross sectional view along a longitudinal axis (640) of the system of FIG. 6 is further illustrated in FIG. 7. While the transceiver transmits RF input receives RF output, the gas continues to flow along the length of the absorption channel while maintaining a desired pressure by the pumping devices.

As generally illustrated in FIG. 7, the system includes pumping devices (711, 712), mmW spectroscopy cell or absorption chamber (705), and buffer cavities (702, 709) that may be co-fabricated with a CMOS process as explained in FIG. 5. The process of integration may further include a chip scale bonding between a transceiver (715) and the integrated spectroscopy cell. RF antennas (706) may further be fabricated in the absorption cell. FIG. 7 (700) includes a collection chamber (702) that receives gas from a gas inlet (701). The gas is passed into a first pumping device (711) for pumping the gas into an absorption chamber or an absorption cell (705). According to an embodiment, the first pumping device (711) is a Knudsen pump. The first pumping device (711) may include a series of narrow chambers (714) integrated with resistive heaters (704), and a series of cooling chambers (713). Large cavities may be etched into the wafer with the fabrication process described in FIG. 5. The CMOS fabrication process may also be used to fabricate a series of chambers in the pumping devices (711 and 712). The resistive heaters heat the gas in the narrow chambers (714), and the cooling chambers (713) cool the gas thereby creating a temperature gradient along the pumping device. The resistive heaters may be switched on and off as needed or programmed with an electronic device (not shown). The temperature gradient creates a gas flow along the pumping device (711) into the absorption cell (705). The resistive heaters may be arranged in series to locally heat the gas in small volume and sequentially to create a flow. The temperature gradient due to heating and cooling causes the gases to flow from chamber to chamber. To enable pump on wafer, a series of pressure co-fabricated gauges read the cooling chamber pressure and control the timing of the heating of the resistive heaters. A second pumping device (712) with resistive heaters (708) may further control the flow rate of the gas flowing from the first pumping device (711) and through the absorption cell (705). In some instances the first pumping device and the second pumping device are readily reversible, so pumps that were acting in series could have one set reverse to further lower the pressure in the absorption cell. The gas may be decompressed in a buffer cavity (709) and purged through a gas outlet (710). Pirani gauges (703) fabricated into the first pumping device (711) and Pirani gauges (707) fabricated into the second pumping device (712) may be utilized to sense pressure, and a feedback mechanism may be used to selectively turn on and off the resistive heaters in each of the pumping devices. According to an example embodiment, the number of chambers or stages in the first pumping device and the second pumping device ranges from 20 to 50. According to another example embodiment, the number of chambers or stages in the first pumping device and the second pumping device ranges from 1 to 1000. According to yet another example embodiment, the number of chambers or stages in the first pumping device and the second pumping device ranges from 10 to 100. The number of stages in the pumping devices depend on the target gas, the volume of the waveguide, and the efficiency of the individual pumping stage and the technique/presence of valves. The target gas is important for the determination of stages in the pumping devices due to the minimum detectable absorption for a particular molecule, the SNR of the transceiver, the requisite pressure to achieve a high Q, the purity of the sample and the variable pumping rates for different molecules. The series of chambers to feed the absorption cell, may be arranged in parallel to achieve the desired flow rate and desired pressure. The number of stages is based on enough built up pressure required for the gas to be sent into the absorption cell. The required pressure may range from atmospheric pressure (~1000 mbar) down to a few mbars. The required pressure may be determined such that when a RF signal is passed into the absorption cell, an absorption spectra captures is less noisy with a good signal to noise ratio (SNR). The SNR may range from 5 to 1000, SNR depends strongly on the length of the spectroscopy cell. For a given pressure the SNR can be increased by designing longer cells. For example in meandered cells, the length of the cells is long enough to have good SNR and at the same time the area of the sensor is kept small.

Figure 8:
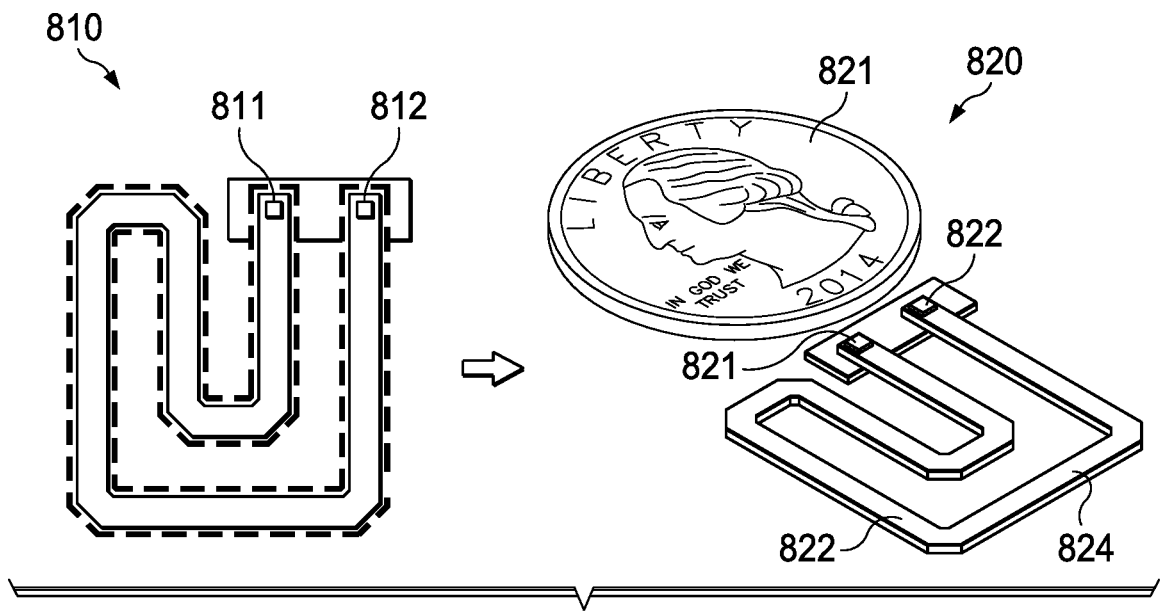
FIG. 8 depicts an example absorption cell, according to one aspect of this description.

FIG. 8 depicts an example absorption cell (810) having a length of about 70 mm and fabricated with the fabrication process described above in FIG. 5. In some instances the length ranges from 50 mm to 100 mm. The size of the cell (820) is compared with a nickel (821) for scale. A rendered assembly incorporating the absorption cell with a CMOS transceiver bonded to the cavity is illustrated in FIG. 8 (830). The transmit (811, 821) and receive (812, 822) terminals are generally shown on the ends of the waveguides (822, 824) so that a transceiver mounted at the end of the cavity is able to connect the transmitter and receiver antennas located at the ends of the cavity. Extreme volumetric scaling due to integration is possible. For example, the volume of the current systems may range from 1-2 $m^3$ compared to approximately 2-3E-6 $m^3$ in the current embodiment. According to another example embodiment, the volume of the absorption cell may range is less than 1 $m^3$. According to yet another example embodiment, the volume of the absorption cell may range is less than 0.2 $m^3$.

Volume of the cell may be determined by determining a target molecule, choosing a target absorption frequency, determining a minimum SNR of signal chain at frequency, optimizing between realizable absorption length in substrate, maximum pressure required to achieve required SNR, efficiency of pumping stages for target molecule and effectiveness of pre-concentration, gettering, and filtering confounding molecules. Finally the total cell volume may be calculated with the following equation.

Total Cell Volume=($WG\_x*WG\_y$*absorption length)+(number of pumping stages to achieve pressure*required flow rate to achieve pressure in a given time [number of parallel stages]*volume of pumping stage).

Wherein $WG\_x*WG\_y$ are the width and depth of the waveguide.

Figure 9:
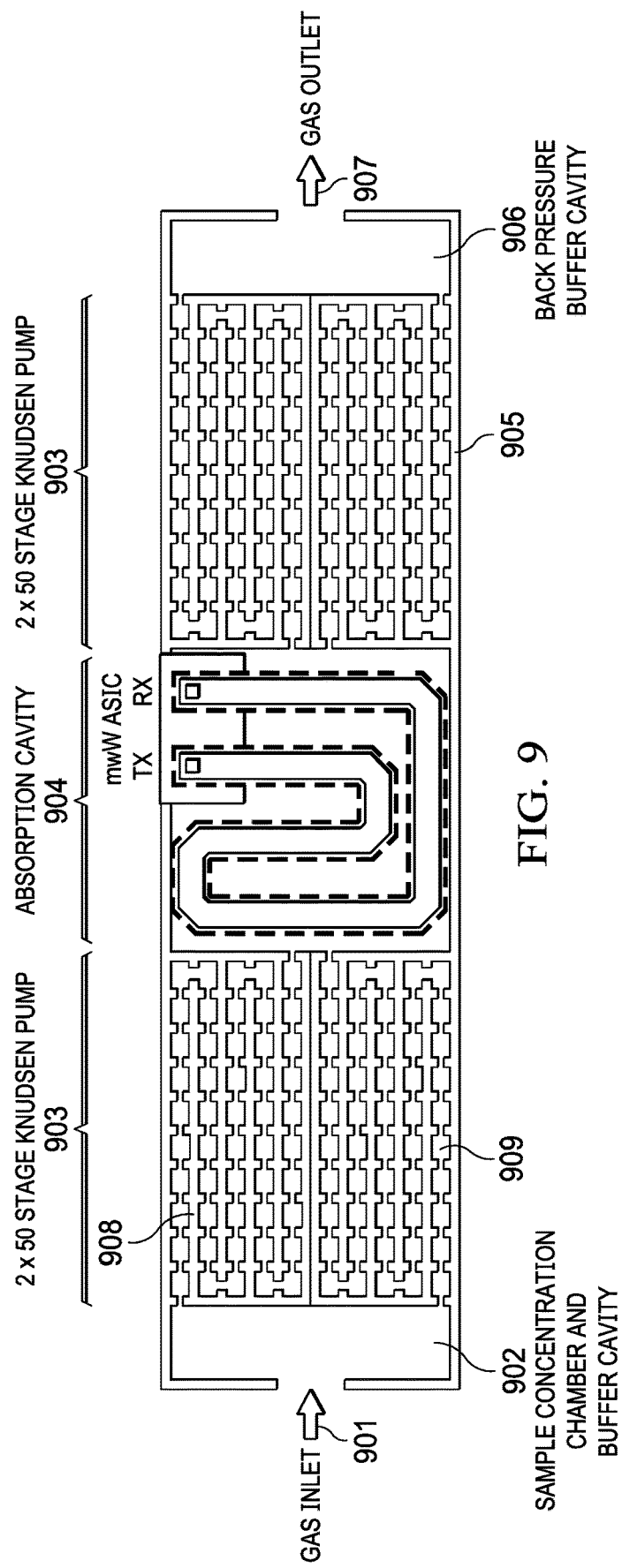
FIG. 9 depicts another example top view of a cross section of the compact mmW spectroscopy cell of FIG. 6, according to one aspect of this description.

FIG. 9 depicts a top view of a cross section of the compact mmW spectroscopy cell system of FIG. 6, according to one embodiment. The cell system includes a gas inlet (901) for collecting the gas, and an input buffer cavity (902) for receiving the gas from the gas inlet (901). The system further includes a first pumping device (903) that pumps the gas from the buffer cavity (902) to an absorption cell (904). The first pumping device further includes narrow heating chambers (908) and larger cooling chambers (909). The absorption cell may be electrically connected to a transceiver through receive and transmit antennas. A second pumping device (905) may be used to control the pressure inside of the absorption cell (904), the second pumping device connected to the absorption cell (904). An output buffer cavity (906) connected to the second pumping chamber (905) may receive the gas, decompress and purge the gas outside through a gas outlet (907).

Figure 10:
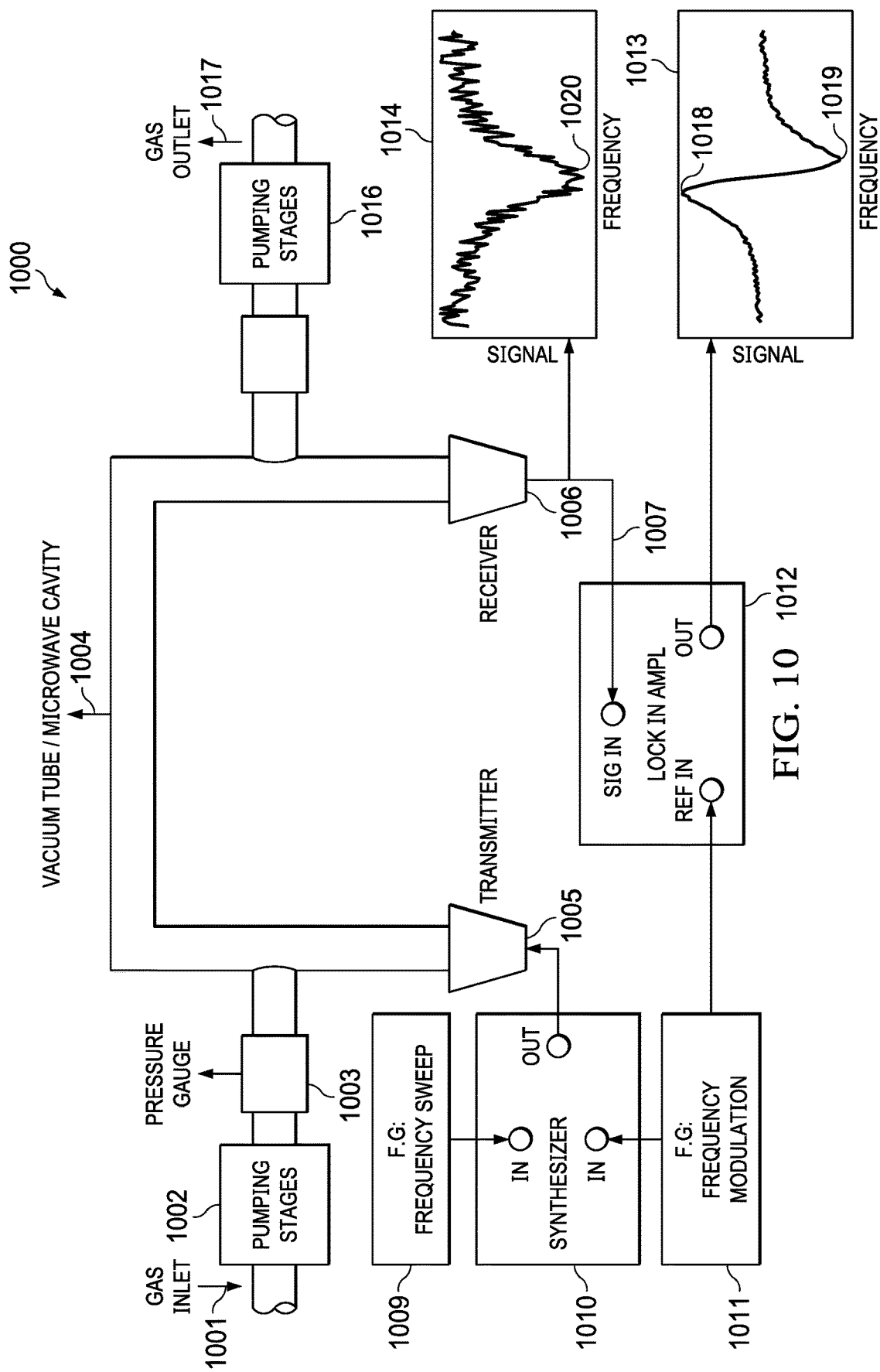
FIG. 10 depicts an example system of the compact mmW spectroscopy cell of FIG. 6 electrically connected to a transceiver, according to one aspect of this description.

FIG. 10 (1000) depicts a system of the compact mmW spectroscopy cell system of FIG. 6 electrically connected to a transceiver, according to one embodiment. The system includes a gas inlet (1001) connected to a pumping device (1002) that is monitored with pressure gauges (1003). The gas is pumped into an absorption cell (1004) and pumped out with a second pumping device (1016) and gas outlet (1017). An electromagnetic signal is transmitted into the tube or absorption cell (1004). According to an example embodiment, a frequency of the electromagnetic signal ranges from 60 GHz to 300 GHz. The electromagnetic signal is received on a receiver (1006) and synced into an input (1007) of lock in amplifier (1012) to a frequency source (1011) and absorption across frequency is generated. The output signal of the receiver may be monitored with a chart (1014), and the output signal of the lock in amplifier may be monitored with another chart (1013). Lock In detection is a way to increase the signal to noise ratio (SNR). Essentially the lock in amplifier is a very good bandpass filter that detects signals only around certain frequency. In this system the signal coming out of the synthesizer is frequency modulated (FM). This signal interacts with the molecules and then received on the receiver. The lock in amplifier detects only signals at the modulation frequency, and thus, the SNR is increased compared to the signal in chart (1014). The device includes a transceiver electrically coupled to the first (1005) and second antennas (1006) and configured to inject a transmit signal into the cavity (1004) through the first antenna, the signal interrogates the molecules in the cavity generating an absorption dips at the quantum transition frequencies of the gases in the cavity, the signal is detected in the second antenna. By scanning a frequency band of interest it is possible to detect the presence of different gases in the cavity by identifying the quantum absorption frequencies. A synthesizer (1010) may receive input from the frequency generator (1009 and the frequency modulator (1011) and output a signal to the absorption cell. In one embodiment, the signal generator (1009) initially sweeps the transmission output frequency through a band known to include the quantum transitions of the gases in the physics cell (1004) (e.g., transitioning upward from an initial frequency below the suspected quantum transition frequency, or initially transitioning downward from an initial frequency above the suspected quantum transition frequency, or other suitable sweeping technique or approach). The transceiver monitors the received energy via an input coupled with (e.g. electrically connected to) a second conductive coupling structure in order to identify the transmission frequency associated with peak absorption by the gas in the cell cavity (1004) (e.g., minimal reception at the receiver). Once the quantum absorption frequency is identified, a loop filter moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy. The loop filter provides negative feedback in a closed loop operation to maintain the signal generator operating at a TX frequency corresponding to the quantum frequency of the cavity dipolar molecule gas and dynamically adjusts a frequency of the transmit signal based on the error signal. The transceiver circuit in certain implementations is implemented on or in an integrated circuit (not shown), to which the vapor cell (1004) is electrically coupled for transmission of the TX signal via the output (1005) and for receipt of the RX signal via the input (1006). The transceiver is operable when powered for providing an alternating electrical output signal TX to the first conductive coupling structure for coupling an electromagnetic field to the interior of the cavity 1004, as well as for receiving the alternating electrical input signal RX from a second conductive coupling structure representing the electromagnetic field received from the cavity 1004. The transceiver circuit is operable for selectively adjusting the frequency of the electrical output signal TX in order to reduce the electrical input signal RX by interrogation to operate the clock generator 1009 at a frequency which substantially maximizes the molecular absorption through rotational state transitions, and for providing a reference clock signal REF_CLK at the frequency of the TX output signal.

Figure 11:
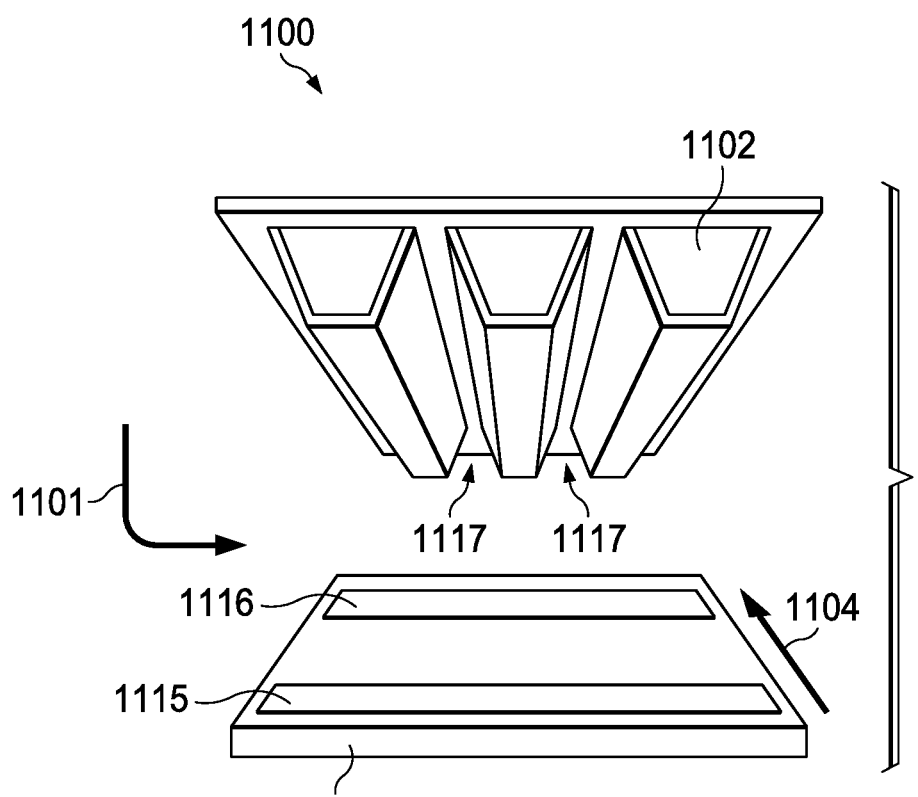
FIG. 11 depicts an example integrated N-stage MEMS electro-osmotic pump for used with an absorption cell, according to one aspect of this description.

FIG. 11 depicts an example integrated N-stage MEMS osmotic pump (1100) for use with an absorption cell. The pump includes a long and high aspect ratio channels (1117) that are closely spaced running along the direction of the gas flow. The number of channels may range from 10 to 100. According to an example embodiment, the channels may be fabricated in a first wafer (1102) through a combination of deposition, patterning, etching and lithography techniques. The example embodiment for a pump for heating and cooling may be accomplished with an ionic flow. A number of cathode (1106) and anode (1105) pairs to charge up and attract ions though cells may be fabricated in a second wafer (1103). The cathode and anode pairs may be fabricated and repeated in the direction of the gas flow (1104) to achieve a desired gas flow to an absorption cell (not shown). The channels and the cathode anode pairs in the first wafer and the second wafer respectively may be fabricated with a standard CMOS process and bonded with wafer scale integration. The pump (1100) illustrated in the example embodiment may replace any of the pumping devices of FIG. 6 and FIG. 9.

FIG. 12 depicts a system of the compact mmW spectroscopy cell of FIG. 6 with an externally driven pump. The system includes an external pump (1211) that pumps gas into an absorption cell (1230). Another external pump (1240) may maintain the flow through the absorption cell (1230) and pump the gas to a buffer cavity (1250) where the gas may be decompressed and purged outside through a gas outlet (1260). In some embodiments the external pumps may be miniaturized traditional squirrel pumps, turbo pumps or other variants. It should be noted any of the combinations, the pumping devices illustrated in FIG. 6, FIG. 11 and FIG. 12 may be used in conjunction with the absorption cell.

Figure 13A:
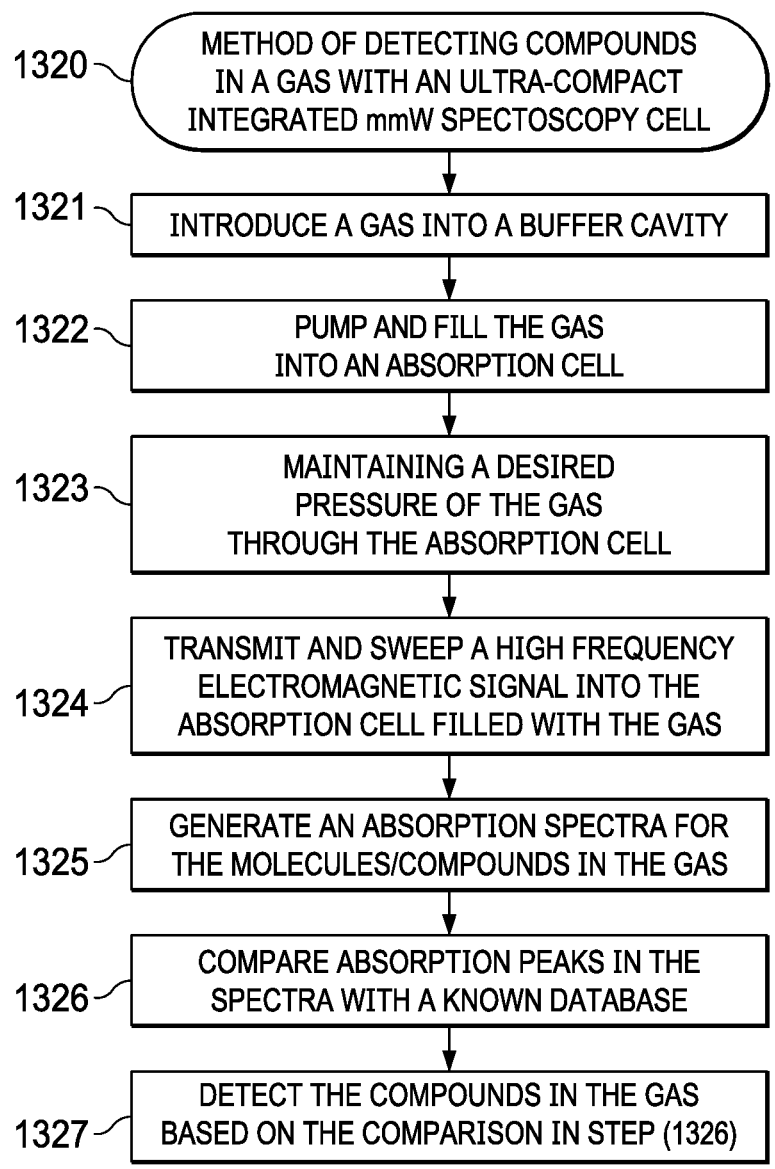
FIG. 13A illustrates an example flowchart method of detecting compounds in a gas with a compact integrated mmW spectroscopy cell, the spectroscopy cell integrated with components for pumping, flow control, chemical concentration, and detection on a single co-fabricated device, according to a preferred embodiment.

FIG. 13A illustrates a flowchart method of detecting compounds in a gas with a compact integrated mmW spectroscopy cell, the spectroscopy cell integrated with components for pumping, flow control, chemical concentration, and detection on a single co-fabricated device. The method may be generally described in terms of the following steps. The method starts at step (1321) where the gas is introduced into a buffer cavity. Next, the method step (1322) pumps and fills the gas into an absorption cell. Following, the method step (1322) maintains a desired pressure of the gas through the absorption cell and in step (1323) transmits and sweeps a high frequency electromagnetic signal into the absorption cell that is filled with the gas. Next, the method step (1324) generates an absorption spectra for the molecules in the gas. The method step (1325) compares absorption peaks in the spectra with a known database; and the step (1326) detects the compounds in the gas based on the comparison in step (1325). Absorption databases are generally known in the art and the database matching of the absorption peaks in the spectra may be matched such that one or more of the elements/Compounds of the gas is detected. The example method advantageously detects multiple compounds without the need for a sensor for each compound. Multiple individual peaks for several target gasses can be captured within a single sweep. These gasses can be uniquely characterized for their absorption depth at a given frequency as well as their broadening in the presence of other molecules. By characterizing the collisional cross section of various combinations of gasses and comparing all of the relevant absorption depths and widths in band, increasingly accurate estimations of the constituent mixtures of gasses in the absorption cell can be estimated.

Figure 13B:
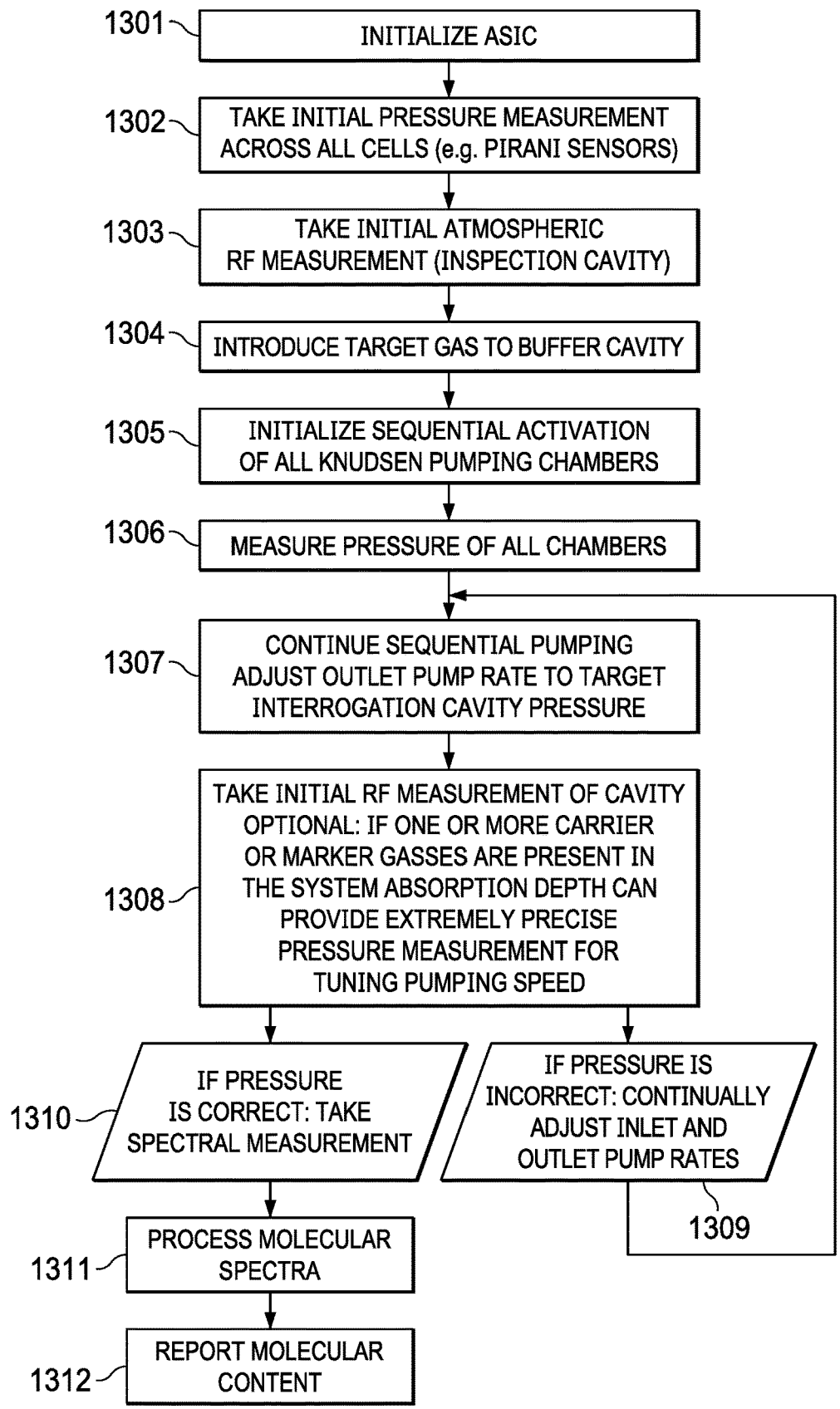
FIG. 13B illustrates an example flowchart method of pumping with a Knudsen pump for detecting compounds in a gas with a compact integrated mmW spectroscopy cell, according to a preferred embodiment.

FIG. 13B illustrates an example flowchart method of pumping gas into an absorption cell with a pumping device such as a Knudsen pump for detecting compounds in a gas. The method may be generally described in terms of the following steps. The method in step (1301) initializes the ASIC and the spectroscopy cell. Next, the method in step (1302) records an initial pressure measurement across all chambers in the pumping device and in step (1303) records an initial RF measurement at atmospheric pressure inside the absorption cell. The method in step (1304) introduces the gas into the absorption cell and in step (1305) initializes sequential activations of all chambers in the pumping devices. Next, the method step (1306) measures pressure of all the chambers. Next, the method in step (1307) adjusts pumping pressure in the pumping device until a desired pressure in the absorption cell is achieved. In step (1308), the method passes and sweeps an electromagnetic signal into the absorption cell and records an absorption spectra. Finally, the method in step (1310) detects the compounds and molecular content in the gas based on the absorption spectra. In step (1309) if the pressure is incorrect, the method returns to step (1307) to adjust the pressure. Next, at (1311) the method processes the molecular spectra and in step (1312) reports the molecular content.

Figure 13C:
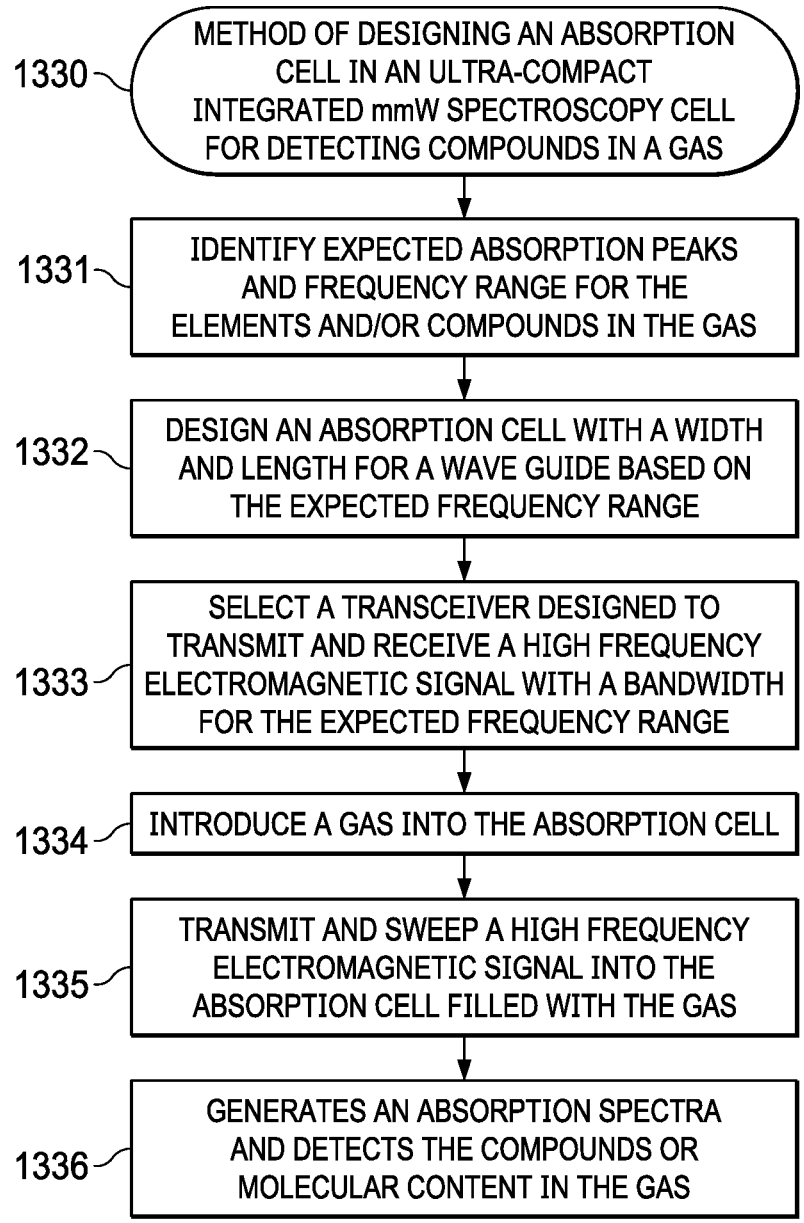
FIG. 13C illustrates an example method of designing an absorption cell in a compact integrated mmW spectroscopy cell for detecting compounds in a gas, according to a preferred embodiment.

FIG. 13C illustrates a method of designing an absorption cell in a compact integrated mmW spectroscopy cell for detecting compounds, in a gas. The method may be generally described in terms of the following steps. In step (1331) the method identifies expected absorption peaks and frequency range for the elements and compounds in the gas. The method in step (1332) designs an absorption cell with a width and depth for a waveguide based on the expected frequency range. Also, the strength of the absorption signal increases with the length of the cavity so in the design step the length of the cavity needs to be taken into account to obtain the minimum SNR as determined by the receiver sensitivity and the noise and power in the signal chain.

According to an example embodiment, the absorption cell may be fabricated along with a pumping device with the example method steps as illustrated in FIGS. 5A-5I. Next, the method in step (1333) selects a transceiver designed to transmit and receive an electromagnetic signal with a bandwidth for the expected frequency range. For an example absorption cell, which may detect 10 different gases, the expected absorption peaks of the 10 gases are identified. Most gases have transition throughout the electromagnetic spectrum, for example, below 100 GHz, between 100 GHz and 200 GHz and above 200 GHz. In another example, if 140-220 GHz is the identified bandwidth for the gases, a WR5 waveguide may be used to detect most of the absorption peaks in all the gases. In another example, if the peaks are below 100 GHz, a WR12 waveguide that covers 60-90 GHZ may be selected and the absorption cell designed. The dimensions of the cavities increase from a 1.3 mm (W)×0.65 mm (L) to 3 mm (W)×1.5 mm (L). The device may be designed with cavity for 3 mm×1.5 mm for WR12 and be sensitive to the expected absorption peaks between frequencies of 60-90 GHz. Depending on the strength of the peaks, the cavity or the absorption cell may be designed. The absorption spectra in some instances may range from 230 GHz to 260 GHz. With a broadband source sweep with a set of known frequencies, the spectral lines for the gases may be detected. Next, the method in step (1334) introduces the gas into the absorption cell and in step (1335) transmits and sweeps a high frequency electromagnetic signal into the absorption cell filled with the gas. Next, the method in step (1336) generates an absorption spectra and detects the compounds or molecular content in the gas. In some embodiments the number of gases detected ranges from 1 to 50. In other embodiments, number of gases, compounds detected is zero to indicate that there are no false positives that the cell can appropriately report the null set (i.e. no false positives).

Figure 14A:
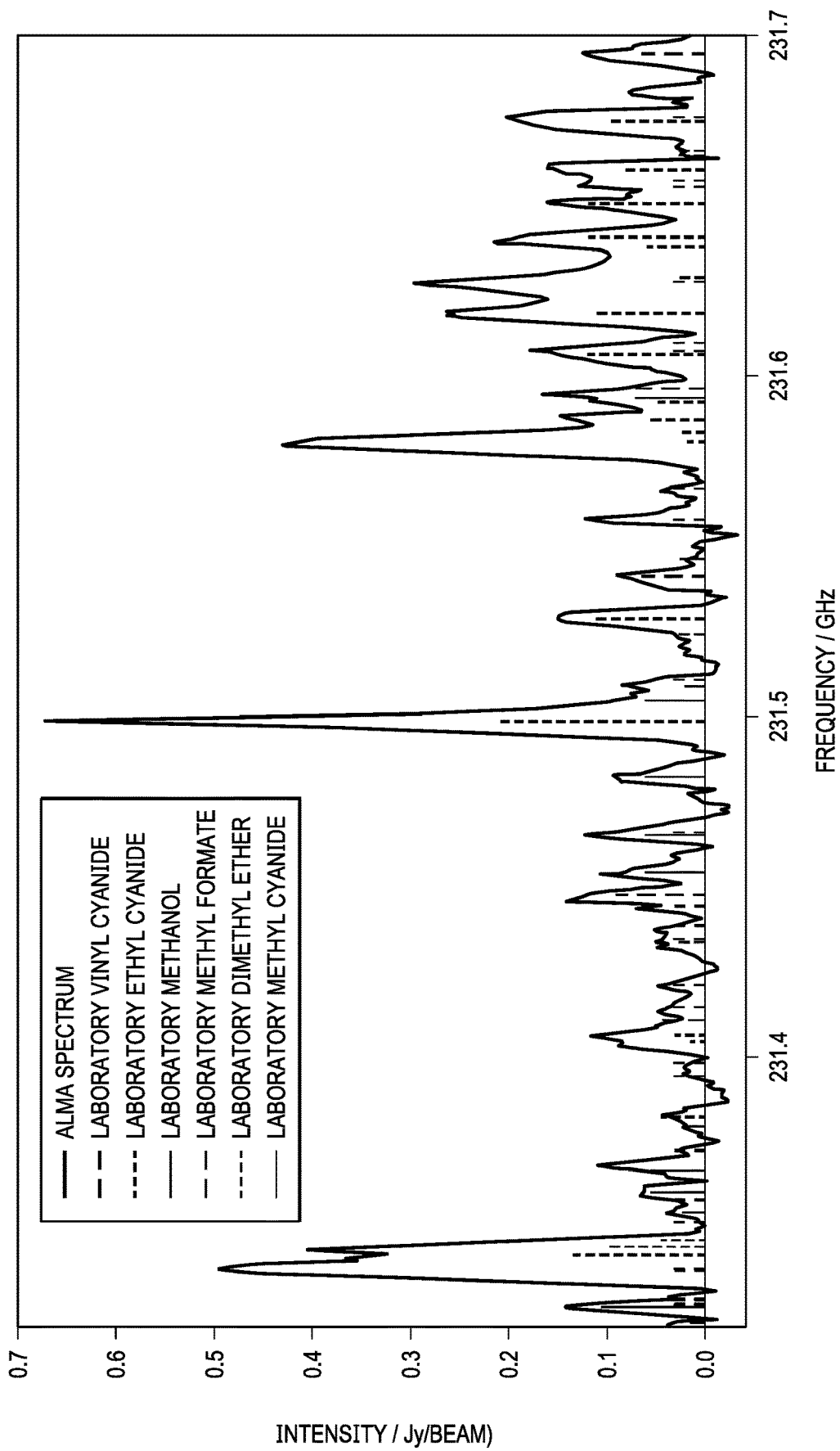
FIG. 14A-B illustrates an example system for multiple cavity/transceiver combinations for detecting chemicals in a broader frequency range, according to some embodiments.
Figure 14B:
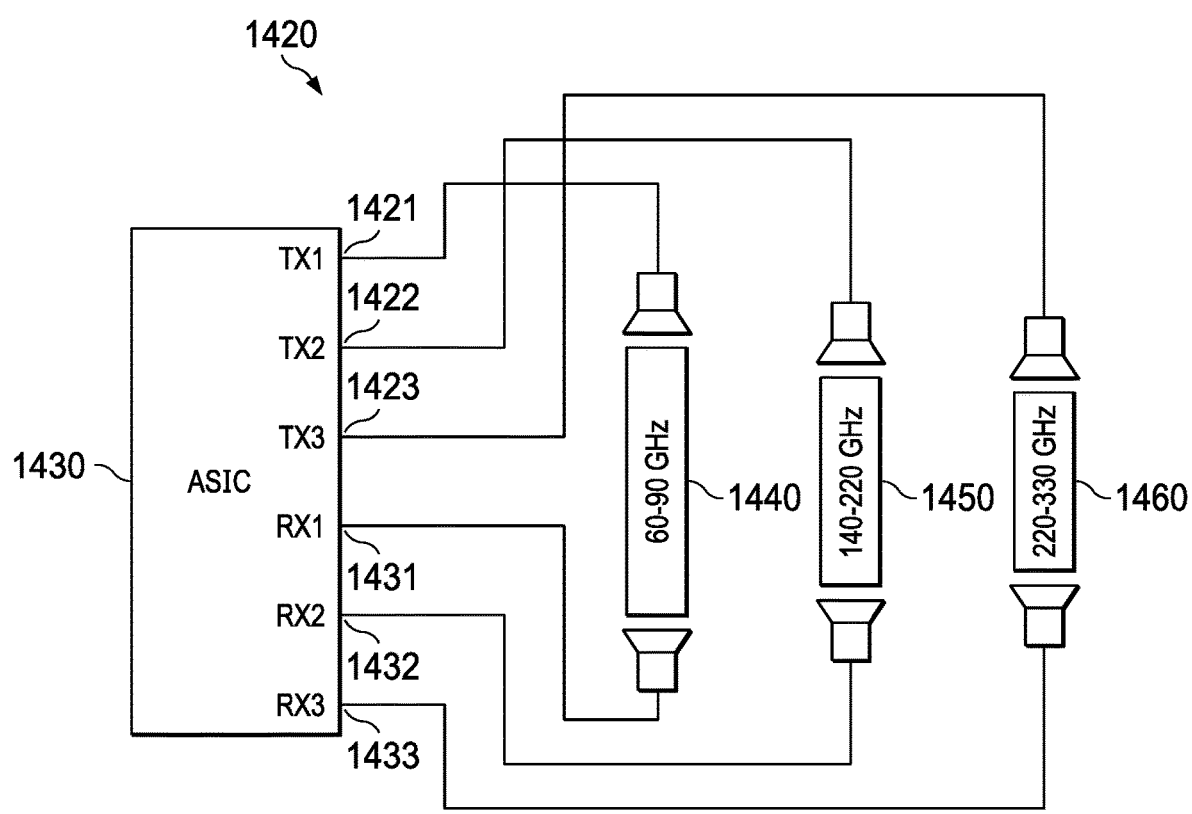
Figure 15:
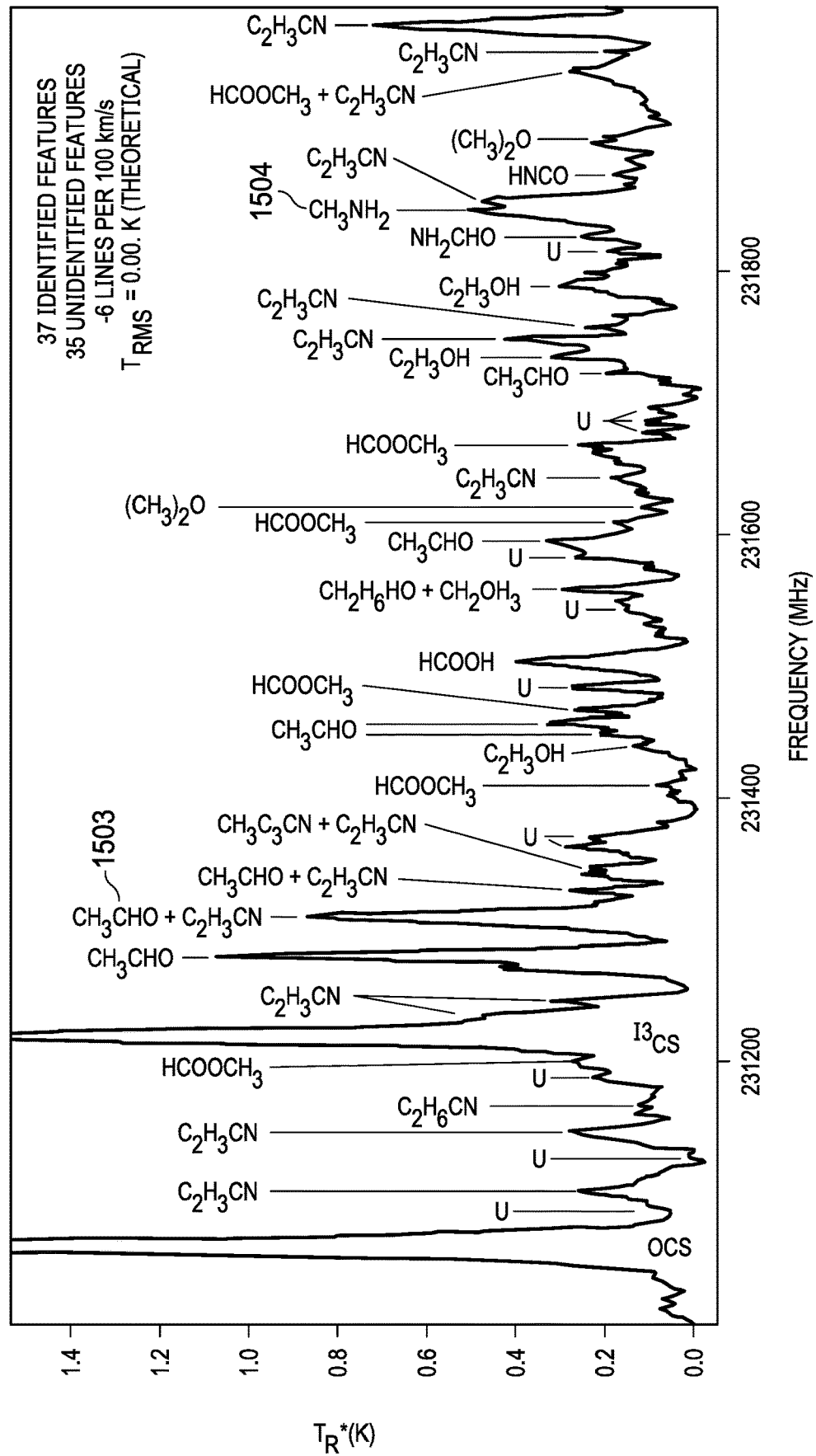
FIG. 15 illustrates a flow chart for identifying chemical a narrow frequency range, according to some aspects of the present embodiment.

FIG. 14 illustrates a system for multiple cavity/transceiver combinations for detecting chemicals in a broader frequency range. Many molecular spectra are already known as illustrated in FIG. 14 (1410) wherein the intensity (1412) is plotted versus frequency (1411). As shown, the peaks for different molecular elements are closely packed, and therefore a narrow band transceiver may be used to generate absorption spectra. Frequency sweeps can be set around known in-band peaks. However, most transceivers are bandwidth limited. For example, a bandwidth in the range of 100 GHz to 240 GHz may require a multi-mode waveguide based on the lower cut off and the upper cut off frequencies. The frequencies between 140 GHz to 220 GHz may be in a mono mode; however, above 220 GHz may require a multimode waveguide. In other embodiments as illustrated in FIG. 14 (1420), an example system for multiple cavity/transceiver combinations for detecting chemicals in a broader frequency range may include multiple transceivers covering different bandwidths and frequencies. Some systems potentially have multiple waveguides/antenna design combinations coupled to multiple transceivers. The example system may include an ASIC (1430) with an absorption cell with multiple transmit and receive antennas. A transceiver (1460) with a bandwidth between 220 GHz to 230 GHz may be electrically connected to transmit (1423) and receive (1433) of the ASIC. Similarly, a transceiver (1450) with a bandwidth between 140 GHz to 220 GHz may be electrically connected to transmit (1422) and receive (1432) of the ASIC. Similarly, a transceiver (1440) with a bandwidth between 60 GHz to 90 GHz may be electrically connected to transmit (1421) and receive (1431) of the ASIC. Depending on the expected absorption peaks of the gases, the transceivers can be selected to transmit an electromagnetic signal. A combination of the transceivers may also be used to detect a wide range of frequencies. The ASIC integration can be monolithic or heterogeneous to the transceiver. In some instances, a narrow band transceiver may be used to detect accurate peaks in an absorption spectrum such as the example in chart (1410). In this case, a transceiver with a bandwidth of 230 GHz to 240 GHz may be used. FIG. 15 illustrates an intensity (1502) versus frequency (1501) graph for identifying chemical species in a narrow frequency range, according to some aspects of the present embodiments. Many Species can be identified in a moderate frequency ranges. For example, $CH_2CHO$ (1503) can be identified at a frequency of 231300 MHz and $CH_3NH_2$ can be identified at a frequency of 231850 MHz.

Figure 16A:
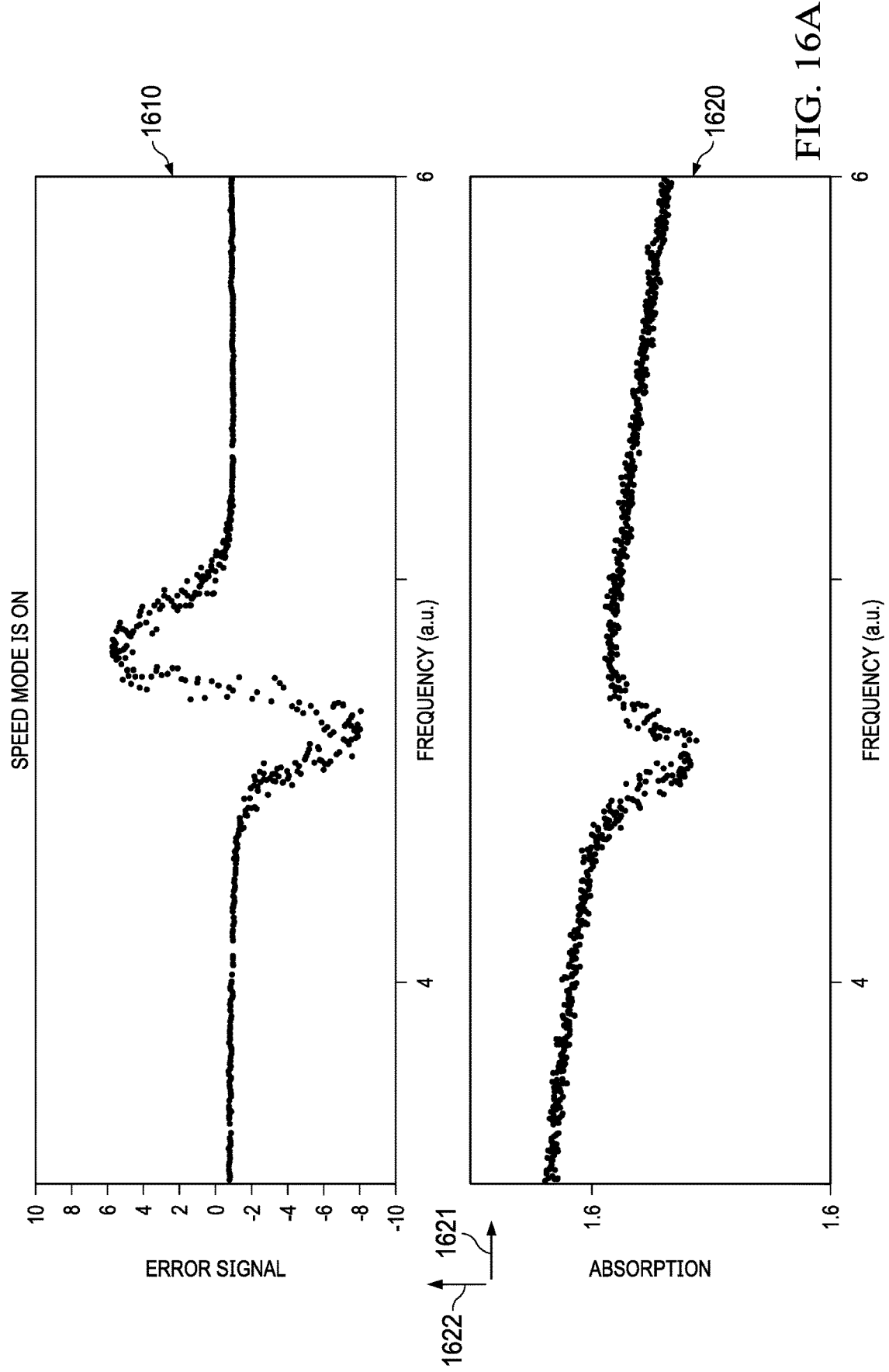
FIGS. 16A-B illustrates absorption data collected for water and OCS with the example system, according to some embodiments.
Figure 16B:
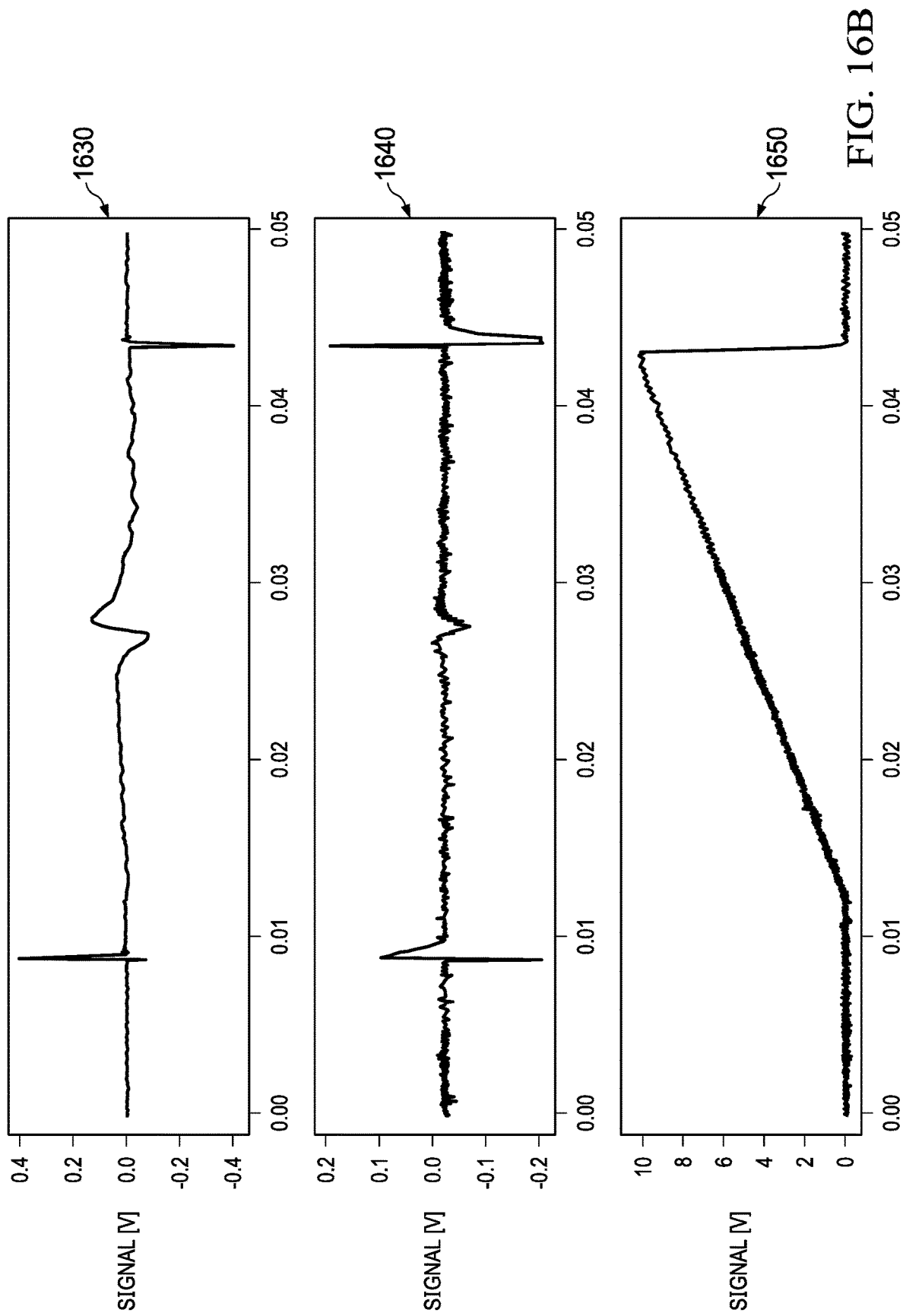
Figure 17:
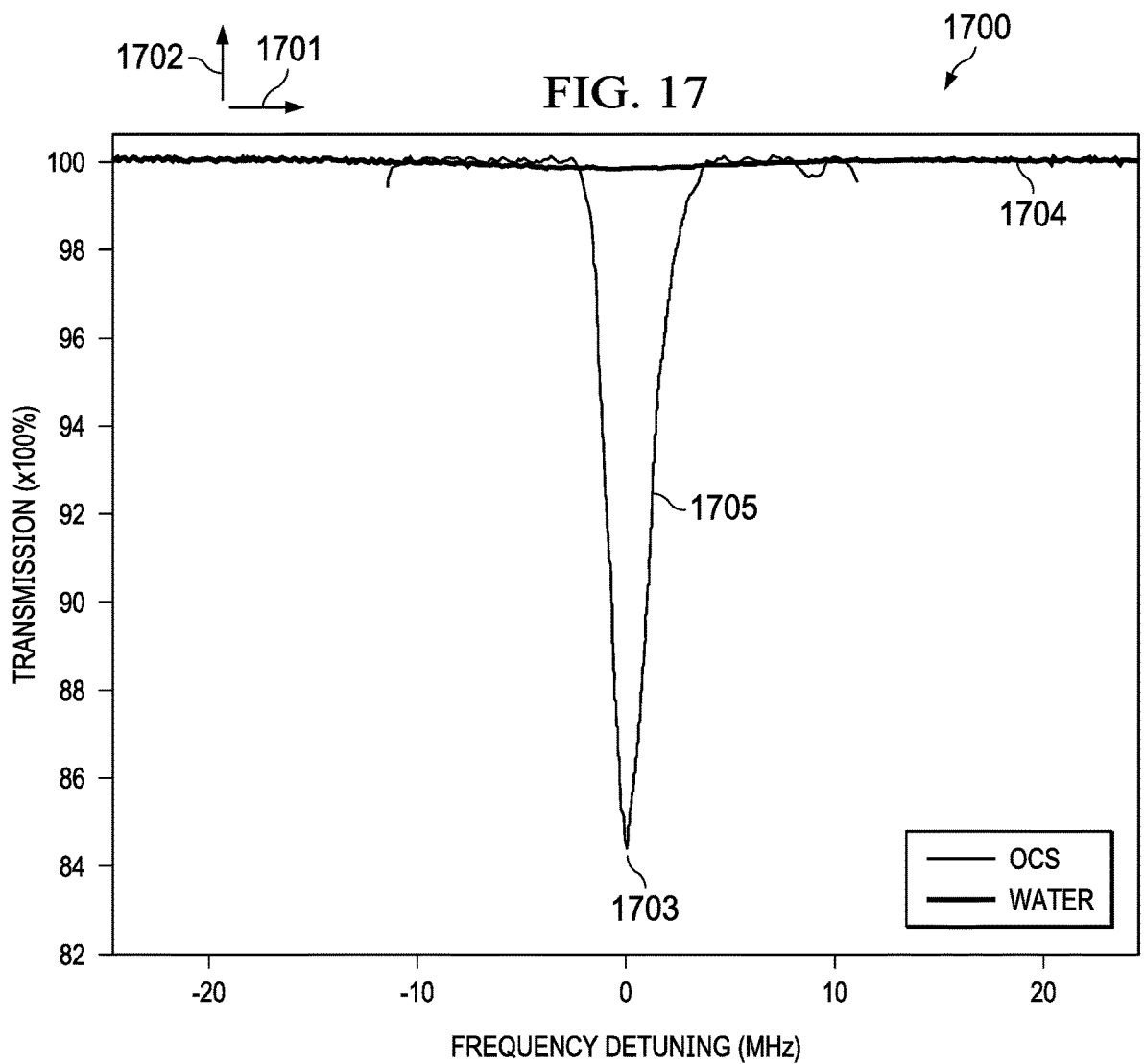
FIG. 17 illustrates absorption data collected for water and OCS with the example system, according to some embodiments.

FIG. 16 and FIG. 17 illustrate absorption data collected for water and OCS (Carbonyl Sulphide) with the example system. Graph 1610 illustrates an error signal versus frequency chart for water, and 1620 illustrates absorption (1622) versus frequency (1621) for water. Similarly, 1630 illustrates a signal coming from the lock-in amplifier versus frequency chart for water, and 1640 illustrates absorption signal coming from the receiver versus frequency for OCS and the frequency ramp is generally shown in 1650.

According to some embodiments, the interfaces for the collection chamber may include bags with filter so that particles are filtered. Current systems around gas sensors use chemical interfaces. A graphene detector with gas absorbed to the surface of the graphene may change the electrical properties such as band gap. Carbon nano tubes also present the problem of gas absorbed to the surface. The surfaces need to be cleaned up after each measurement and sometimes heating may be a solution to remove the molecules adsorbed to the surfaces. After repeated cycles, the reliability of the sensor results are degraded. In the present example embodiments this problem is not present because there is no active absorption of any gas to the surface of any material that substantially impacts the cell chemically or electrically or changes the characteristic RF performance of the system.

Figure 18A:
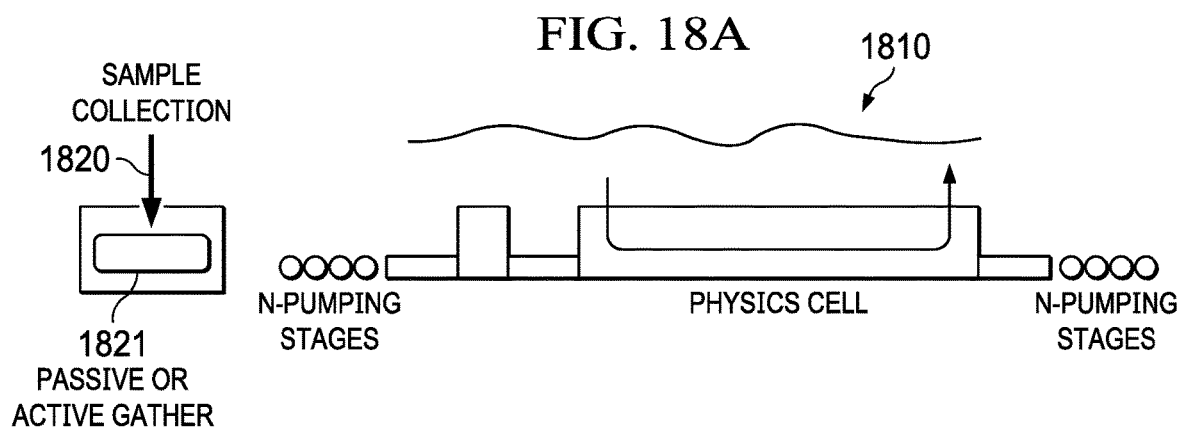

FIG. 18A illustrates wafer level and system level components for removal of contaminants in collected samples, which are used for detecting compounds, according to one example embodiment. Since excess $H_2O$ will invariably be present in a breath sample, there are several approaches for addressing the system impact due to the excess $H_2O$. According to one example embodiment, active or passive getters may be deposited during fabrication. As illustrated in FIG. 18A (1820), a sample gas may be passed through an active or passive getter (1821) before introducing the gases to the spectroscopy system (1810) for detecting compounds or molecular content in the gas. In some embodiments, there can be multiple stages of active or passive getters. In other embodiments, there can be multiple getters to address different contaminant in gasses.

Absorption spectra of some breath biomarkers covered by an octave spanning frequency comb are generally illustrated in FIG. 18B (1830). The figure includes a plot of line strength (1832) versus frequency (1831). At system level, as illustrated in a Frequency combs, (1830) can be utilized to detect background gasses, a combination of measurements from integrated pressure sensors (e.g. Pirani gauges), and EM gas detection can allow calculation of pressure broadening of the target molecule. At collection level, samples can be subject to desiccation and pre-concentration.

Modifications are possible in the described embodiments, and other embodiments are possible, within the scope of the claims.

System Summary

An compact integrated mmW spectroscopy cell for compounds detection in a gas, the system comprising: an input buffer cavity for receiving the gas from a gas collection chamber; a first pumping device enabled to pass the gas from the buffer cavity to an absorption cell; the absorption cell configured to be electrically connected to a transceiver; a second pumping device configured to control the pressure inside of the absorption cell; the second pumping device connected to the absorption cell; an output buffer cavity connected to the second pumping chamber; wherein the transceiver interrogates the absorption cell filled with the gas by passing a high frequency electromagnetic signal and sweeping the signal to generate an absorption spectra, the spectra compared to a spectroscopy database for detecting the compounds in the gas.

Method Summary

The method may be broadly generalized as of detecting compounds in a gas with a compact integrated mmW spectroscopy cell, the spectroscopy cell integrated with components for pumping, flow control, chemical concentration, and detection on a single co-fabricated device, the method comprising the steps of:
 a. introducing the gas into a buffer cavity;
 b. pumping and filling the gas into an absorption cell;
 c. maintaining a desired pressure of the gas through the absorption cell;
 d. transmitting and sweeping a high frequency electromagnetic signal into the absorption cell filled with the gas;
 e. generating an absorption spectra for the molecules in the gas;
 f. comparing absorption peaks in the spectra with a known database; and
 g. detecting the compounds in the gas based on the comparison in step (f).

This general method may be modified heavily depending on a number of factors, with rearrangement and/or addition/deletion of steps anticipated by the scope of this description. Integration of this and other preferred example embodiment methods in conjunction with a variety of preferred example embodiment systems described herein is anticipated by the overall scope of this description.

System/Method Variations

This basic system, method, and product-by-process may be augmented with a variety of ancillary embodiments, including but not limited to:
 An embodiment wherein the programmable code is loaded from a CPU.
 An embodiment wherein the first pumping device and the second pumping device are positioned on either end of the absorption cell.
 An embodiment wherein the first pumping device and the second pumping device are further configured to control the flow rate of the gas through the absorption cell.
 An embodiment wherein the first pumping device and the second pumping device are Knudsen pumps.
 An embodiment wherein the first pumping device and the second pumping device each comprise a plurality of cooling chambers for cooling the gas, resistive heaters for heating the gas, and Pirani gauges for sensing pressure in the chambers.
 An embodiment wherein the gas is heated with the resistive heaters and cooled in the cooling chambers to create a temperature gradient such that a desired flow rate is achieved through each of the chambers.
 An embodiment wherein resistive heaters are further turned on and off with an electronic circuit.
 An embodiment wherein the output buffer cavity further allows the gas to decompress and purge to outside.
 An embodiment wherein the first pumping device and the second pumping device further comprises pirani gauges; the pirani gauges configured to measure pressure in the chambers of the first pumping device and the second pumping device.
 An embodiment wherein the first pumping device is external to the absorption cell.
 An embodiment wherein the second pumping device is external to the absorption cell.
 An embodiment wherein the first pumping device and the second pumping device is further comprise electrodes; the electrodes configured with an anode and a cathode to enable ionic flow.
 An embodiment wherein number of chambers in the first pumping device and the second pumping device ranges from 1 to 10.
 An embodiment wherein the chambers in the first pumping device and the second pumping device are arranged in parallel, series or a combination.
 An embodiment wherein a frequency of the electromagnetic signal ranges from 60 GHz to 300 GHz.
 An embodiment wherein waveguides in the absorption cell are selected from a group consisting of: WR5, WR6, and WR12
 An embodiment wherein a bandwidth of the electromagnetic signal ranges from 60 GHz to 100 GHz.
 An embodiment wherein the absorption cell is bonded to the transceiver with chip scale integration.
 An embodiment wherein the absorption cell is fabricated on a first wafer with a CMOS process; the buffer cavity, the first pumping device, the second pumping device, the input buffer cavity, and the output buffer cavity are fabricated on a second wafer with a CMOS process; the first wafer and the second wafer bonded to create the compact integrated mmW spectroscopy cell.
 An embodiment wherein the absorption cells is fabricated with a series of breaks in bond lines on a wafer.
 An embodiment wherein the dimensions of a waveguide are chosen in the absorption cell such that the electromagnetic signal maintains integrity in the absorption cell.
 An embodiment wherein the number of gas molecules in the gas ranges from 1 to 50.
 An embodiment wherein the gas is pre-concentrated in a pre-concentrated cell before introducing the gas into the collection chamber.
 An embodiment wherein the gas is processed through a getter before introducing the gas into the collection chamber.
 An embodiment wherein the compound is a volatile organic compound in an exhaled breathe sample.
 An embodiment wherein the compound is a disease marker in an exhaled breathe sample.
 An embodiment wherein the compound is a toxin.

An embodiment wherein the compound is an explosive.

An embodiment where the compound is a critical feature in a chemical process, ambient environment, exhaust, waste, etc.

What is claimed is:

1. A spectroscopy cell system for detecting compounds in a gas, the system comprising: an input buffer cavity for receiving the gas from a gas collection chamber;
    a first pumping device configured to pass the gas from the buffer cavity to an absorption cell; the absorption cell configured to be electrically connected to a transceiver;
    a second pumping device configured to control the pressure inside of the absorption cell, the second pumping device connected to the absorption cell; an output buffer cavity connected to the second pumping chamber;
    the absorption cell configured to be interrogated by the transceiver passing a high frequency electromagnetic signal, sweeping the signal to generate an absorption spectra, and comparing the spectra to a spectroscopy database for detecting the compounds in the gas in the absorption cell.

2. The system of claim 1 wherein the gas collection chamber is further configured to collect the gas and introduce the gas into the buffer cavity.

3. The system of claim 1 wherein the first pumping device and the second pumping device are positioned on either end of the absorption cell.

4. The system of claim 1 wherein the first pumping device and the second pumping device are further configured to control the flow rate of the gas through the absorption cell.

5. The system of claim 1 wherein the first pumping device and the second pumping device are Knudsen pumps.

6. The system of claim 1 wherein the first pumping device and the second pumping device each comprise a plurality of cooling chambers for cooling the gas, resistive heaters for heating the gas, and Pirani gauges for sensing pressure in the chambers.

7. The system of claim 6 wherein the gas is heated with the resistive heaters and cooled in the cooling chambers to create a temperature gradient such that a desired flow rate is achieved through each of the chambers.

8. The system of claim 6 wherein resistive heaters are further turned on and off with an electronic circuit.

9. The system of claim 1 wherein the output buffer cavity further allows the gas to decompress and purge to outside.

10. The system of claim 1 wherein the first pumping device and the second pumping device further comprises Pirani gauges; the Pirani gauges configured to measure pressure in the chambers of the first pumping device and the second pumping device.

11. The system of claim 1 wherein the first pumping device is external to the absorption cell.

12. The system of claim 1 wherein the second pumping device is external to the absorption cell.

13. The system of claim 1 wherein the first pumping device and the second pumping device is further comprise electrodes; the electrodes configured with an anode and a cathode to enable ionic flow.

14. The system of claim 1 wherein number of chambers in the first pumping device and the second pumping device ranges from 1 to 1000.

15. The system of claim 1 wherein the chambers in the first pumping device and the second pumping device are arranged in parallel, series or a combination.

16. The system of claim 1 wherein a frequency of the electromagnetic signal ranges from 60 GHz to 300 GHz.

17. The system of claim 1 wherein waveguides in the absorption cell are selected from a group consisting of: WR5, WR6, and WR12.

18. The system of claim 1 wherein a bandwidth of the electromagnetic signal ranges from 60 GHz to 100 GHz.

19. The system of claim 1 wherein the absorption cell is bonded to the transceiver with chip scale integration.

20. The system of claim 1 wherein the absorption cell is fabricated on a first wafer with a CMOS process; the buffer cavity, the first pumping device, the second pumping device, the input buffer cavity, and the output buffer cavity are fabricated on a second wafer with a CMOS process; the first wafer and the second wafer bonded to create the compact integrated mmW spectroscopy cell.

21. The system of claim 1 wherein the absorption cells is fabricated with a series of breaks in bond lines on a wafer.

22. The system of claim 1 wherein the dimensions of a waveguide are chosen in the absorption cell such that the electromagnetic signal maintains integrity in the absorption cell.

23. The system of claim 1 wherein the number of gas molecules in the gas ranges from 1 to 50.

24. The system of claim 1 wherein the gas is pre-concentrated in a pre-concentrated cell before introducing the gas into the collection chamber.

25. The system of claim 1 wherein the gas is processed through a getter before introducing the gas into the collection chamber.

26. The system of claim 1 wherein the compound is a volatile organic compound in an exhaled breathe sample.

27. The system of claim 1 wherein the compound is a disease marker in an exhaled breathe sample.

28. The system of claim 1 wherein the compound is a toxin.

29. The system of claim 1 wherein the compound is an explosive.

* * * * *